(12) United States Patent
Schartner et al.

(10) Patent No.: US 10,500,669 B2
(45) Date of Patent: Dec. 10, 2019

(54) METHOD AND APPARATUS FOR PROVIDING WELDING TYPE POWER WITH BALANCED BUS

(71) Applicant: Illinois Tool Works Inc., Glenview, IL (US)

(72) Inventors: Quinn W. Schartner, Kaukauna, WI (US); Bernard J. Vogel, Troy, OH (US); Andrew D. Nelson, Grand Chute, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1365 days.

(21) Appl. No.: 14/535,994

(22) Filed: Nov. 7, 2014

(65) Prior Publication Data

US 2015/0060426 A1 Mar. 5, 2015

Related U.S. Application Data

(63) Continuation-in-part of application No. 14/469,788, filed on Aug. 27, 2014, now Pat. No. 9,862,052.
(Continued)

(51) Int. Cl.
*B23K 9/10* (2006.01)
(52) U.S. Cl.
CPC .................. *B23K 9/1062* (2013.01)
(58) Field of Classification Search
CPC ............................ B23K 9/1006; B23K 9/1056
(Continued)

(56) References Cited

U.S. PATENT DOCUMENTS 5,991,169 A * 11/1999 Kooken ............... B23K 9/1056
219/137 PS
6,091,049 A * 7/2000 Ikeda ................... B23K 9/0953
219/130.21
(Continued)

FOREIGN PATENT DOCUMENTS

CN 202162482 3/2012
EP 0970775 1/2000
(Continued)

OTHER PUBLICATIONS

International Search Report, dated Jan. 5, 2016, European Patent Office, Rijswijk, Netherlands.
(Continued)

*Primary Examiner* — Dana Ross
*Assistant Examiner* — Ayub A Maye
(74) *Attorney, Agent, or Firm* — George R. Corrigan

(57) ABSTRACT

A welding-type power supply includes a controller, bus (that can, but need not be preregulated), and an output converter. The controller has a preregulator control output and an output converter control output. The controller may receive bus feedback indicative of a plurality of bus voltages. A bus voltage balancing module in the converter includes a scaled correction module responsive to the bus feedback signal, and the converter control output is responsive to the bus voltage balancing module. The controller may receive load feedback indicative of a load output, have a bus voltage balancing module that includes a load proportional gain module responsive to the load.

6 Claims, 11 Drawing Sheets

Related U.S. Application Data which is a continuation of application No. 13/839,235, filed on Mar. 15, 2013, now Pat. No. 10,112,251.

(60) Provisional application No. 61/674,780, filed on Jul. 23, 2012.

(58) Field of Classification Search
USPC ... 219/130.1, 130.21, 130.33, 130.5, 137 PS
See application file for complete search history.

(56) References Cited

U.S. PATENT DOCUMENTS

| | | | |
|---|---|---|---|
| 6,269,015 B1 | 7/2001 | Ikeda | |
| 6,329,636 B1 * | 12/2001 | Geissler | B23K 9/1006 |
| | | | 219/130.1 |
| 6,365,868 B1 * | 4/2002 | Borowy | B23K 10/006 |
| | | | 219/121.54 |
| 6,713,721 B2 | 3/2004 | Albrecht | |
| 6,815,639 B2 * | 11/2004 | Geissler | B23K 9/1006 |
| | | | 219/130.1 |
| 6,987,242 B2 * | 1/2006 | Geissler | B23K 9/1006 |
| | | | 219/130.1 |
| 7,049,546 B2 * | 5/2006 | Thommes | B23H 7/08 |
| | | | 219/130.21 |
| 7,078,652 B2 * | 7/2006 | Bunker | B23K 9/1043 |
| | | | 219/130.1 |
| 7,235,759 B2 * | 6/2007 | Geissler | B23K 9/1006 |
| | | | 219/130.1 |
| 8,455,794 B2 | 6/2013 | Vogel | |
| 8,785,816 B2 * | 7/2014 | Kooken | B23K 9/095 |
| | | | 219/130.1 |
| 2002/0056708 A1 | 5/2002 | Moriguchi | |
| 2003/0066823 A1 | 4/2003 | Decoster | |
| 2006/0243716 A1 * | 11/2006 | Stava | B23K 9/093 |
| | | | 219/130.5 |
| 2007/0051712 A1 | 3/2007 | Kooken | |
| 2009/0021966 A1 | 1/2009 | Jacobson et al. | |
| 2009/0160249 A1 * | 6/2009 | Soma | B60L 11/005 |
| | | | 307/9.1 |
| 2009/0230941 A1 | 9/2009 | Vogel | |
| 2010/0006551 A1 * | 1/2010 | Geissler | B23K 9/1018 |
| | | | 219/130.1 |
| 2011/0155703 A1 | 6/2011 | Winn | |
| 2013/0114306 A1 * | 5/2013 | Kooken | H02M 1/10 |
| | | | 363/21.01 |
| 2014/0021180 A1 | 1/2014 | Vogel | |

FOREIGN PATENT DOCUMENTS

| | | |
|---|---|---|
| GB | 2265722 | 10/1993 |
| WO | 2011155703 | 12/2011 |

OTHER PUBLICATIONS

First Chinese Office Action, dated Sep. 11, 2015, SIPO, 100088 Beijing China.

International Search Report, dated Mar. 25, 2014, European Patent Office, Rijswijk, Netherlands.

* cited by examiner

METHOD AND APPARATUS FOR PROVIDING WELDING TYPE POWER WITH BALANCED BUS

RELATED APPLICATIONS

This is a continuation-in-part of, and claims the benefit of the filing date of, U.S. patent application Ser. No. 13/839,235, filed on Mar. 15, 2013, which claims priority of provisional application 61/674,780, filed Jul. 23, 2012, and this application is a continuation-in-part of, and claims the benefit of the filing date of, U.S. patent application Ser. No. 14/469,788, filed on Aug. 27, 2014.

FIELD OF THE INVENTION

The present disclosure relates generally to the art of welding type power supplies. More specifically, it relates to welding type power supplies that include multiple power processing circuits, such as an inverter type power supply. It has features and controls that allow it to be reconfigured as part of a modular welding type power supply system.

BACKGROUND OF THE INVENTION

There are many known types of welding-type power supplies. Welding-type power, as used herein, refers to power suitable for electric arc welding, plasma arc cutting or induction heating. Welding type system, as used herein, is a system that can provide welding type power, and can include control and power circuitry, wire feeders, and ancillary equipment. Welding-type power supply, as used herein, is a power supply that can provide welding type power.

Providing welding-type power, and designing systems to provide welding type power, provides unique challenges. Welding type systems will often be moved from one location to another, and be used with different inputs, such as single or three phase, or 115V, 230V, 460V, 575V, etc., or 50 hz or 60 hz signals. Power supplies that are designed for a single input cannot provide a consistent output across different input voltages, and components in these power supplies that operate safely at a particular input level can be damaged when operating at an alternative input level. Also, power supplies for most fields are designed for relatively steady loads. Welding, on the other hand, is a very dynamic process and numerous variables affect output current and load, such as arc length, electrode type, shield type, air currents, dirt on the work piece, puddle size, weld orientation, operator technique, and lastly the type of welding process determined to be most suitable for the application. These variables constantly change, and lead to a constantly changing and unpredictable output current and voltage. Power supplies for many fields are designed for low-power outputs. Welding-type power supplies are high power and present many problems, such as switching losses, line losses, heat damage, inductive losses, and the creation of electromagnetic interference. Accordingly, welding-type power supply designers face many unique challenges.

Additionally, welding-type power supplies or systems are often sold for one or more particular processes, such as stick, TIG, MIG, pulse, sub-arc, heating, cutting, and the maximum output power or current can be anywhere from one hundred or less amps, to five hundred or more. The maximum output of a particular welding-type power system is chosen for the process and/or commercial market for which it is intended. While welding type power is a high power level, some welding type systems must provide power and/or output current than others. For example, the required output of a 300 amp stick welding system is different from the required output of a 600 amp MIG welding system.

Prior art welding type systems have typically been designed for a particular output, and the power circuitry, controller, output circuitry, etc., are designed with the maximum output power in mind. A 100 amp system might be different from a 200 amp machine, which is different from a 300 amp machine and so forth. Thus, a welding type system is often designed from the ground up. Other times, in an effort to reduce the attending engineering costs, a welding-type power supply is scaled up for a higher output by increasing switch capacities, or placing switches in parallel. However, there are limits to this sort of scaling up, and it gets ever more costly for components to tolerate ever greater currents. Both of these approaches in designing new welding type systems required extensive design, engineering, and testing, and were thus relatively expensive.

U.S. Pat. No. 6,713,721 (hereby incorporated by reference), entitled Method of Designing and Manufacturing Welding-Type Power Supplies, issued to Albrecht on Mar. 30, 2004, teaches to use a single power topology with a given output current, and then to place modules in parallel as needed to obtain a desired output current. For example, if each module produces 250 amps, and 750 amps is needed, then three parallel modules are used. While using modules in parallel as taught in U.S. Pat. No. 6,713,721 provides for increased output current, the output voltage for multiple modules is no higher than the output voltage for a single module.

One prior art welding type power supply that is well suited for portability and for receiving different input voltages is a multi-stage system with a preregulator to condition the input power and provide a stable bus, and an output circuit that converts or transforms the stable bus to a welding-type output. Examples of such welding-type systems are described in U.S. Pat. No. 7,049,546 (Thommes) and U.S. Pat. No. 6,987,242 (Geissler), and US Patent Publication 20090230941 (Vogel), all three of which are owned by the owner of this disclosure, and hereby incorporate by reference. Miller® welders with the Autoline® feature include some of the features of this prior art.

There are many types of welding type power supplies that can provide a welding type power output from an AC or DC source of power. One general category of power supply is known as a switched-mode power supply that utilizes power semiconductor switches to chop a DC source of power and convert this chopped power to a voltage and/or current suitable for welding.

One type of switched-mode power supply is commonly known in the welding industry is an inverter type power supply. An inverter type power supply chops the source of DC power and applies it to the primary of a transformer. The frequency of the chopped voltage is typically much higher than the AC line frequency (50 to 60 Hz), commonly used as a source of power. Typical switching frequencies are in the range of 20 KHz to 100 KHz. This higher frequency allows the inverter transformer to be much small than a comparable line frequency transformer. The secondary of the transformer transforms the chopped voltage to a voltage and current level suitable for welding. Typically the secondary of the transformer is connected to a rectifier and converted to DC and fed to a smoothing inductor to filter the output. This smoothed output is then used as the output of the welding type power supply. For some welding type power sources the DC output is further processed and converted to an AC welding type output such as for AC GTAW.

There are many circuit topologies that can be used for an inverter based welding type power supply. Amongst these are topologies commonly known as forward circuit, full-bridge, half-bridge, flyback, and others. The source of DC power for these types of power supplies is typically derived by rectifying a source of AC line power. An inverter type power supply may also include a pre-regulator circuit following the rectifier and preceding the inverter circuit. The pre-regulator circuit can serve the function of providing a regulated DC bus voltage to the inverter circuit that may be at a voltage level different from the raw rectified AC voltage. This pre-regulator circuit may also include a power factor control that can be used to improve the power factor of the current drawn from the AC line. One prior art welding type power supply that uses pwm control of the output is described in U.S. Pat. No. 8,455,794, hereby incorporated by reference.

FIG. 1 shows a simplified schematic for an inverter based welding type power supply consistent with those shown in U.S. Pat. Nos. 7,049,546 and 6,987,242. AC line voltage is rectified, shown with three phase AC, could alternately be single phase. Typical values for AC line voltage can range from 115VAC or lower to 600VAC. The inverter power supply may be designed for a single nominal AC line voltage or for a range of AC line voltages. The rectifier may include a filter capacitor, shown as C3, and provide an output voltage (Vrectified).

A pre-regulator may be included to provide a regulated bus voltage (Vbus) which may be regulated to a voltage greater than the peak of the rectified AC line voltage. The pre-regulator circuit may also contain a power factor correction circuit or control to improve the power factor for the current or power drawn from the AC line. FIG. 1 shows a boost converter circuit arrangement for the pre-regulator. The switching of power semi-conductor Z3 is controlled by the gate drive signal provided by the pre-regulator/inverter control. The switching of Z3 can be controlled in such a manner to provide a regulated Vbus as well as perform power factor correction.

The inverter topology shown is a half-bridge circuit with the primary of the high frequency inverter transformer, T1, connected between the center point of capacitors C1 & C2 and the junction between power semiconductor switches Z1 & Z2. Power semiconductor switches are switched on and off by a gate drive circuit which is shown as part of the inverter control. The switching frequency and ON/OFF ratio (or duty cycle, D) of the power semiconductor switches is controlled by the inverter control to provide a regulated output voltage and/or current of the welding type power supply. Z1 & Z2 alternately chop the DC bus voltage and create a high frequency AC voltage on the primary of the transformer. For the half-bridge circuit shown the bus voltage is split in half by the two capacitors, so effectively when either Z1 or Z2 is switched on, one half of Vbus is applied across the primary of the transformer. The transformer transforms the voltage to a level suitable for welding. The center tapped secondary of the transformer is connected to a diode rectifier (D2, D3) which rectifies the secondary high frequency AC voltage to create a DC output. The DC output is filtered by inductor L1 to provide a smoothed output current to a welding arc. Additional components and circuits not shown in FIG. 1 may be included such as snubbers and pre-charge circuits, EMI filters, gate drive circuits, control power supplies and various other circuits.

A current sensor (CS1) provides a feedback signal indicative of the output current (I_out). Voltage feedback is also provided to the inverter control circuit, V_out. The inverter control may also provide other functions such as monitoring thermal sensors, controlling cooling fans, receiving and sending various status and control signals to other circuits and controls such as a welding control. The weld controller shown allows the user to select and control a welding process, and may provide various signals, indicators, controls, meters, computer interfaces, etc. to allow the user to set up and configure the welding type power supply as required for a given welding process. The weld controller typically will provide a command signal to the inverter control, indicated as I_ref. This command signal may be an output current level for the power supply or may be a more complex waveform or signal dependant on the particular weld process and user inputs, voltage and current feedback signals and other conditions at the welding arc. Voltage feedback, current feedback, and other signals may be provided to the weld control.

Welding type power supplies such as shown in FIG. 1 are often designed to operate from industrial level AC power such as 230, 460 or 575VAC. As such the bus voltage Vbus may be greater than 900 Volts. This level of bus voltage may require power semiconductor switches (Z1, Z2, Z3) that have voltage ratings on the order of 1200 Volts. Circuits such as snubbers, slow voltage transition (SVT) or other circuits may be required to reduce switching losses within the power semiconductors because of the bus voltage level. In addition a series arrangement of bulk capacitors (C1,C2) may be required to attain sufficient voltage rating. These capacitors may not share the voltage perfectly and end up with a mismatch voltage level.

Welding type power supplies are often designed with components that can handle the full range of input voltage and power and provide a given welding type power output. This may not be optimum for certain applications, making the welding type power supply more complex or expensive than may be necessary.

It can be desirable to have a welding type power supply that can handle a range of inputs such as illustrated above, yet use lower voltage power semiconductors which may switch more efficiently and reduce or eliminate the need for snubbers and other circuits to reduce switching losses. It can also be desirable to maintain a well balanced sharing of voltage for bus capacitors when a series arrangement is used. It can also be desirable to provide a welding type power supply that can be readily adapted for different input voltages and power levels along with various welding outputs.

Accordingly, a welding-type system having a power topology comprised of a modular system, preferably one that can provide a desired output current greater than the output of any one module, and/or an output voltage greater than the output voltage of any one module is desired. Preferably, the system maintains the advantages of prior art portable, universal input systems, but also avoids some of the deficiencies of the prior art is desired.

SUMMARY OF THE PRESENT INVENTION

According to a first aspect of the disclosure a welding-type power supply includes a controller, a preregulator, a preregulator bus, and an output converter. The controller has a preregulator control output and an output converter control output. The preregulator receives a range of inputs voltages as a power input, and receives the preregulator control output as a control input, and provides a preregulator power output signal. The preregulator includes a plurality of stacked boost circuits. The preregulator bus receives the preregulator output signal. The output converter receives the preregulator bus as a power signal and receives the output converter control output as a control input. The output converter provides a welding type power output, and includes at least one stacked inverter circuit.

According to a second aspect of the disclosure a welding-type power supply includes a controller, a preregulator, a preregulator bus, and an output converter. The controller has a preregulator control output and an output converter control output. The preregulator receives a range of inputs voltages as a power input, and receives the preregulator control output as a control input, and provides a preregulator power output signal. The preregulator includes a stacked boost circuit. The preregulator bus receives the preregulator output signal. The output converter receives the preregulator bus as a power signal and receives the output converter control output as a control input. The output converter provides a welding type power output, and includes at least one stacked inverter circuit.

The controller includes a bus voltage balancing module in another embodiment. The bus voltage balancing module includes one or both of an integrator and an accumulator in various embodiments, and/or receives feedback from the pre-regulator and output converter in various embodiments.

According to a third of the disclosure a welding-type power supply includes a controller, a preregulator, a pre-regulator bus, and an output converter. The controller has a preregulator control output and an output converter control output. The controller includes a bus voltage balancing module, and the preregulator control output is responsive to the bus voltage balancing module. The preregulator receives a range of inputs voltages as a power input, and receives the preregulator control output as a control input, and provides a preregulator power output signal. The preregulator provides a preregulator output signal and provides feedback to the bus voltage balancing module. The preregulator includes at least one stacked boost circuit. The preregulator bus receives the preregulator output signal. The output converter receives the preregulator bus as a power signal and receives the output converter control output as a control input. The output converter provides a welding type power output, and includes at least one stacked inverter circuit.

The preregulator bus is voltage regulated in one embodiment.

The output converter includes a dual stacked inverter in another embodiment.

The plurality of stacked boost circuits is a dual stacked boost circuit, a triple stacked boost circuit, or more than three stacked boost circuits in various embodiments.

The controller includes a current balance module and/or an output converter flux balancing module in various embodiments.

The controller includes a start up module and/or a power down module in other embodiments.

The controller includes a power circuit configuration detection module, and one or both of the preregulator control output and the output converter control output are responsive to the power circuit configuration detection module in another embodiment.

The welding-type power also has a user-notification module responsive to the power circuit configuration detection module and an auxiliary power circuit detection module in another embodiment.

The welding-type power supply also includes a synthetic auxiliary ac power circuit having an ac adjustable frequency auxiliary power output and/or a variable speed cooling fan receives auxiliary power output and blows air toward at least part of the preregulator and the output converter in another embodiment.

The output converter includes a stacked full bridge inverter in another embodiment.

According to another aspect of the disclosure a welding-type power supply includes a bus (which can but need not be preregulated), an output converter, and a controller. The output converter receives the bus and provides a welding type power output. the bus also has a control input, and switches in the output converter are controlled by the control input. The controller receives bus feedback signal indicative of a plurality of bus voltages. The controller also has a converter control output connected to the control input. A bus voltage balancing module in the converter includes a scaled correction module responsive to the bus feedback signal, and the converter control output is responsive to the bus voltage balancing module.

According to another aspect of the disclosure a method of providing welding-type power includes providing a bus (which can but need not be preregulated) and converting the bus using a switched converter to a welding type power output. The converting is controlled in response to bus feedback indicative of a plurality of bus voltages, by adjusting pulse widths of switches in the converter in proportion, over a range, to a difference between the plurality of bus voltages to balance the bus.

According to another aspect of the disclosure a welding-type power supply includes a bus (which can but need not be preregulated), an output converter, and a controller. The output converter receives the bus and provides a welding type power output in response to a control input because switches in the output converter are controlled by the control input. The controller receives load feedback indicative of a load output, and provides a converter control output connected to the control input. The controller has a bus voltage balancing module that includes a load proportional gain module responsive to the load.

According to another aspect of the disclosure a method of providing welding-type power includes providing a split preregulated bus having first and second bus voltages, and converting the preregulated bus using a stacked inverter to a welding type power output. A first inverter receives the first bus voltage and a second inverter receives the second bus voltage. The converting is controlled in response to bus feedback indicative of the first and second of bus voltages by adjusting pulse widths of switches in the converter in proportion, over a range, to a difference between the plurality of bus voltages to balance the preregulated bus. Load feedback indicative of a load output is received, and pulse widths of switches are adjusted in the converter in inverse proportion, over a range, to the load feedback.

The controller also receives load feedback indicative of a load output, and the bus voltage balancing module includes a load proportional gain module responsive to the load feedback in one embodiment.

The controller further receives feedback indicative of an OCV or load condition, and the bus voltage balancing module includes a duty cycle limiting module responsive to the OCV feedback in another embodiment.

A preregulator provides power to the preregulator bus in one embodiment.

The bus is a split bus with a first bus voltage and a second bus voltage and the bus feedback signal is responsive to a difference between the first and second bus voltages exceeding a threshold in another embodiment.

The switched converter is a stacked inverter having at least two inverters and the preregulated bus is a split bus having two bus voltages, each feeding an inverter and the plurality of bus voltages are the two bus voltages, and the adjusting includes providing a greater pulse width a first one of the two inverters, wherein the first one of the two inverters receives a bus voltage that is greater than a second bus voltage received by a second inverter, wherein the pulse width is greater in proportion, over a range, to a difference between the plurality of bus voltages, thereby balancing the preregulated bus, in various embodiments.

Load feedback indicative of a load output is received, and the pulse widths are adjusted in inverse proportion, over a range, to the load feedback, in another embodiment.

OCV feedback indicative of an OCV or load condition is received, and the duty cycle of the switched converter is limited in response to the OCV feedback in one embodiment.

The controller receives a bus feedback signal indicative of a plurality of bus voltages, and the bus voltage balancing module includes a scaled correction module responsive to the bus feedback signal, and the converter control output is responsive to the bus voltage balancing module, in various embodiments.

Figure 1:
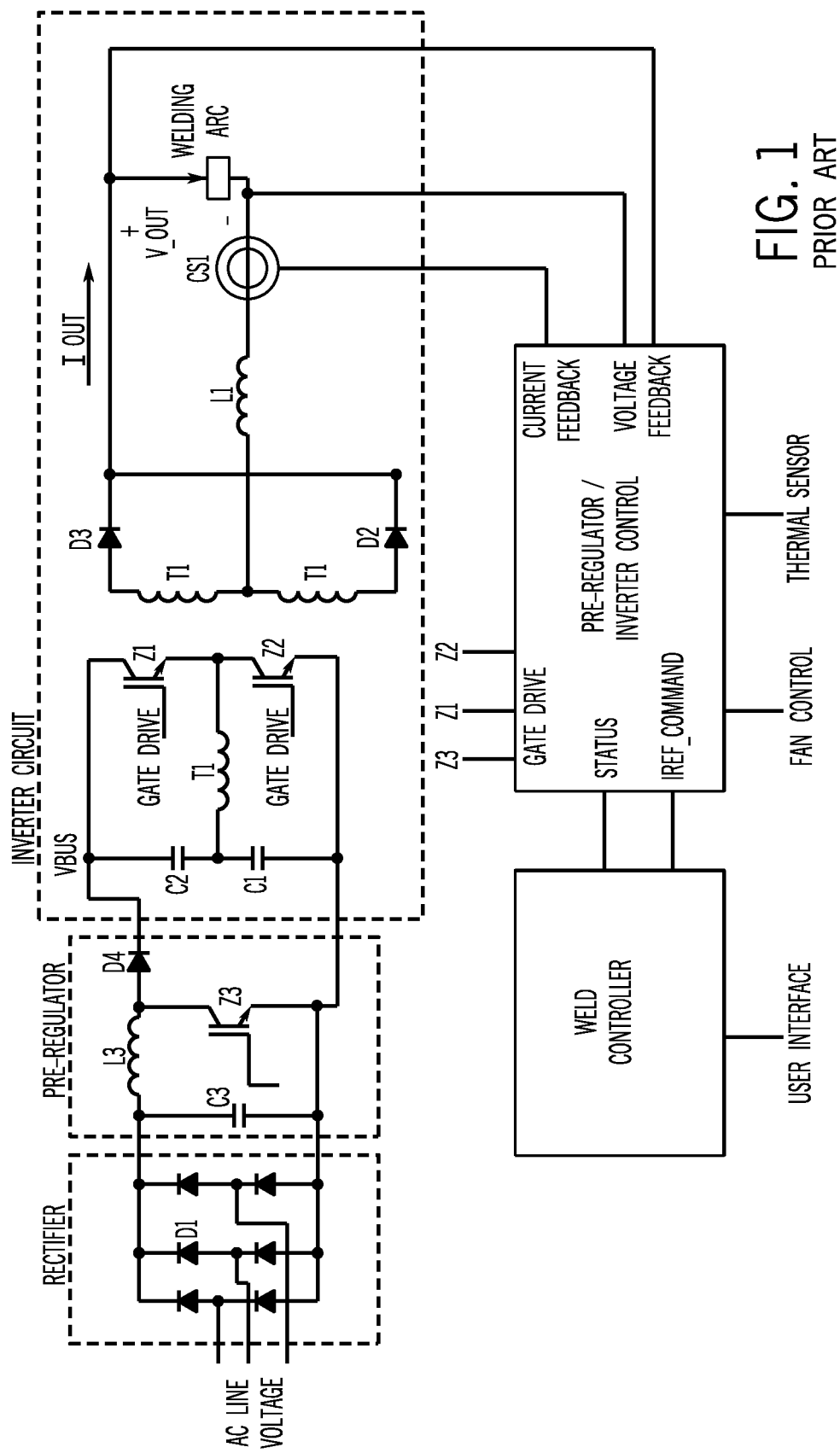
FIG. 1 is schematic for a prior art inverter based welding type power supply.

Before explaining at least one embodiment of the method and system in detail it is to be understood that the disclosure is not limited in its application to the details of construction and the arrangement of the components set forth in the following description or illustrated in the drawings. The method and system is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the method and system will be illustrated with reference to particular circuits and topologies it should be understood at the outset that the method and system can be implemented with other circuits and topologies.

Figure 3:
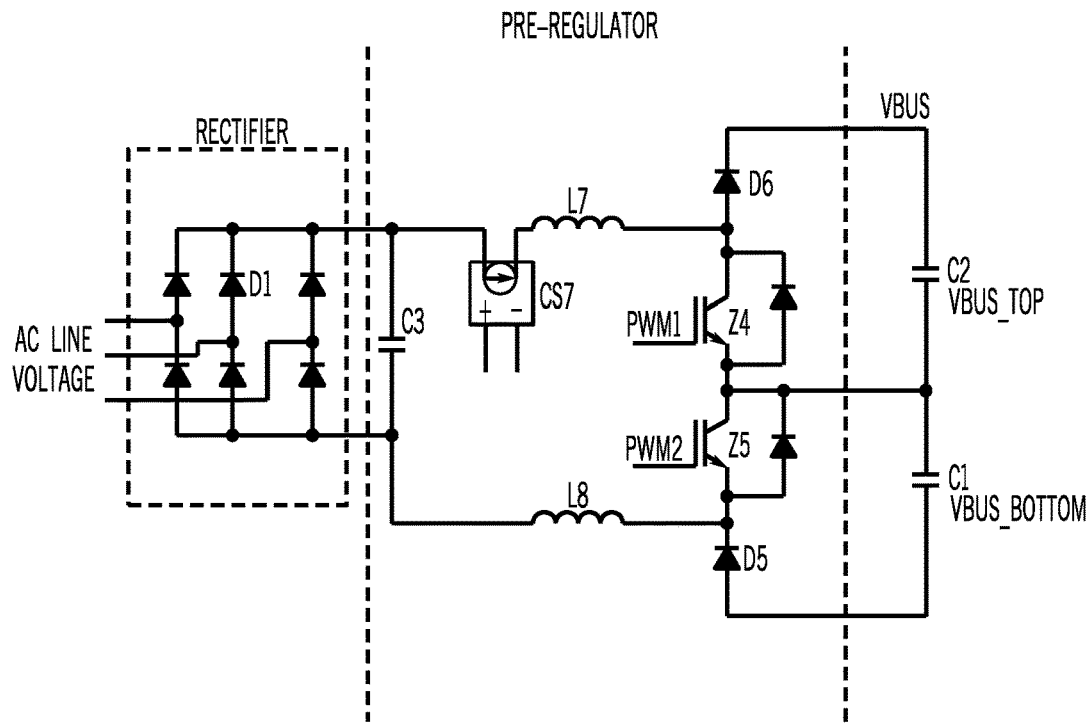
FIG. 3 is a single stacked boost pre-regulator power circuit in accordance with the preferred embodiment.

Generally, the method and system include a welding type power supply with a dual stacked boost pre-regulator circuit and a dual stacked full bridge inverter circuit output converter. Stacked boost circuit, as used herein, is a boost circuit including two switches, two diodes, and two capacitors in a series arrangement, wherein the collector of one switch is connected to the emitter of the other switch, and each switch has an inductor associated therewith. Each switch is clamped to its associated bus capacitor by the series arrangement with the diodes. A single stacked boost may have one inductor connected to either the upper or lower switch. A dual boost preferably has an inductor with each switch so that the current can be balanced between the two upper branches, and likewise for the two lower branches. Stacked boost circuit can have groups of parallel switches. If a MOSFET switches are used, they are connected drain to source, and if other switches are used they are connected in like manner. FIG. 3 shows a stacked boost circuit. Stacked inverter circuit, as used herein, is two inverter circuits with the primary side switches connected in series. A single stacked inverter circuit is an arrangement of at least one switch connected to a lower bus and at least one switch connected to an upper bus driving at single transformer.

One configuration of the welding type power supply consists of a single stacked boost pre-regulator circuit to provide a lower power configuration for the pre-regulator circuit. Another configuration of the welding type power supply consists of a single stacked full bridge inverter circuit to provide a lower power configuration for the inverter power circuit. A controller is provided to control the operation of the pre-regulator and output circuits. Controller, as used herein, is the digital and/or analog circuitry and/or logic/instructions that cooperate to provide control signals to one or more circuits. A controller can be located on a single board, or distributed across multiple locations. Dual stacked boost circuit, as used herein, is two stacked boost circuits connected in parallel, with a common output bus, also fed from a common input rectifier. Alternatives include two rectifiers fed from a common AC source, and/or two separate output busses. Output converter, as used herein, is power circuitry that receives an intermediate signal such as a bus and provides an output power signal. Output converter control output, as used herein, is a control output used to control one or more switches in an output converter, and can be comprised of multiple control signals. Preregulator, as used herein, is a power circuit that receives input power one form, and provides it in another form to another power processing circuit. Preregulator bus, as used herein, is the bus that is the output of a preregulator. Preregulator control output, as used herein, is a control output used to control one or more switches in an preregulator, and can be comprised of multiple control signals. Preregulator output signal, as used herein, is the power output of a preregulator.

The controller provides various control algorithms and features. Preferably, it includes a plug and play module that can detect the power circuit configuration and adapt or modify the control as required, provide status information to the user as to the detected configuration and possible operation outside of the intended parameters, detect optional power supplies and adapt or modify a control based on the presence of these supplies (example: 115VAC aux. power circuit, wire feeder power supply, etc.). Power circuit configuration detection module, as used herein, is a control module that detects the configuration of a power supply, such as whether a single or dual stacked boost circuit is being used. Module, as used herein, is software and/or hardware that cooperates to perform one or more tasks, and can include digital commands, control circuitry, power circuitry, networking hardware, etc.

Also, the system preferably includes a module for actively balancing a bus voltage shared between two or more series capacitors, such as an accumulator or integrator function, to accumulate a bus voltage difference, with coordination of bus balancing between pre-regulator and inverter or other circuits.

The system preferably includes a module for actively balancing current flow for a dual boost configuration and/or a module for coordinating and controlling start up and shut down of aux. power supplies, and/or active flux balancing for the inverter circuit to reduce the likelihood of transformer saturation, and/or a module for providing variable speed fan for cooling, and/or a module for providing various self checks to assure proper operation of the pre-regulator and inverter circuits.

Figure 2:
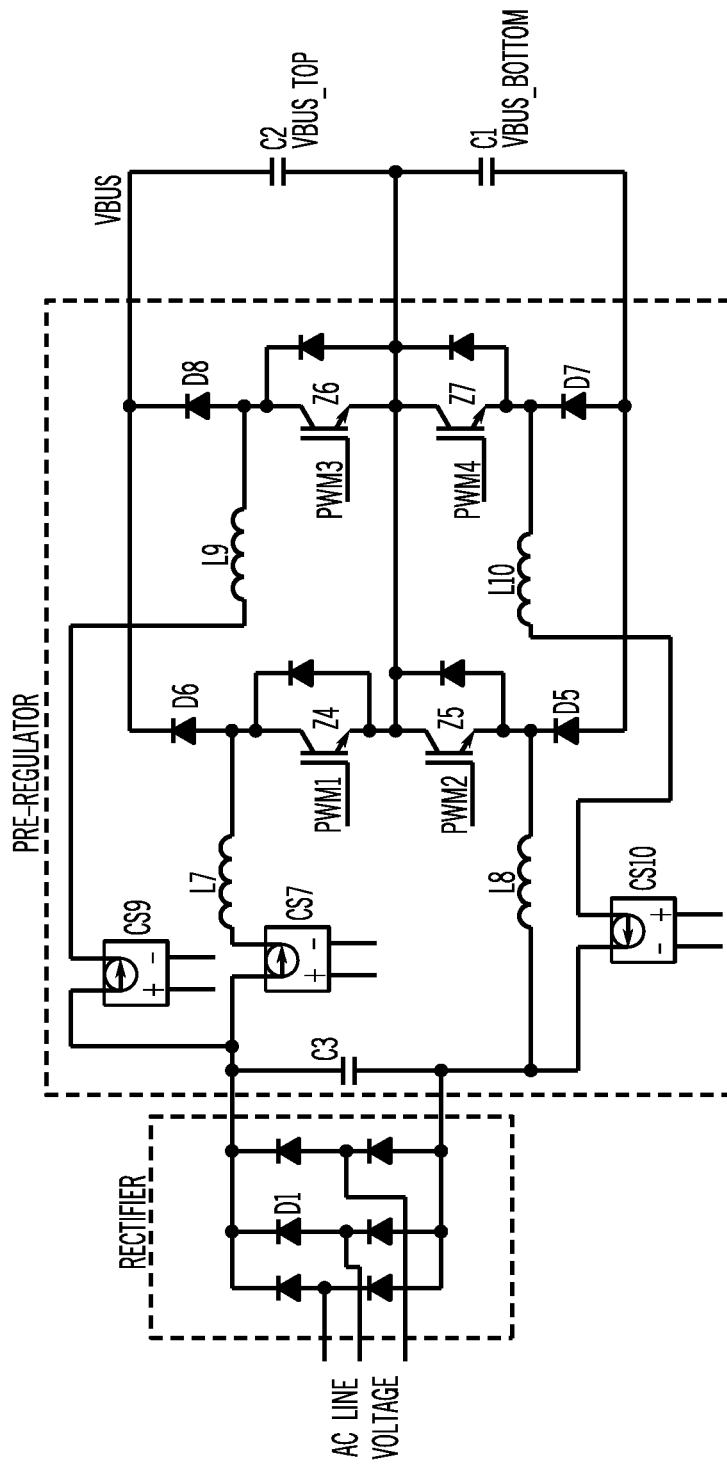
FIG. 2 is a dual stacked boost pre-regulator power circuit in accordance with the preferred embodiment.

A dual stacked boost pre-regulator power circuit is illustrated in FIG. 2. The output of the pre-regulator circuit shown is a regulated bus voltage indicated as Vbus. The bus voltage is shared approximately equally between two series capacitors C1 and C2. Vbus_top & Vbus_bottom represent the two capacitor voltages. Capacitors C1 and C2 may each be comprised of a single capacitor or multiple capacitors forming a capacitor bank. The input to the pre-regulator circuit is provided by a rectifier that converts AC line voltage to a rectified DC voltage. The rectifier may be supplied with a range of line voltages (ex. 230VAC, 460VAC, 575VAC) and operate on either single or three phase. Range of inputs voltages, as used herein, is a range spanning at least two utility voltages.

The pre-regulator circuit may be designed to operate over a continuous span of input voltage and provide an output bus voltage that is regulated at an approximately constant voltage that is greater than the highest rectified voltage (ex. 920VDC). Alternately, the pre-regulator may provide a bus voltage that is at a level such that at some AC line voltages the pre-regulator shuts down and passes the rectified line voltage without further boosting (ex. may stop boosting when line voltage reaches 575VAC+15%). Also, the pre-regulator may be provided with any source of DC voltage such as from a battery or generator. In some cases AC line voltage may be provided by a generator, alternator or utility power. The preregulator preferably provides a voltage regulated bus. Voltage regulated bus, as used herein, is a bus regulated to a desired voltage or voltage waveform.

The pre-regulator circuit shown in FIG. 2 is comprised of two boost circuits with series connected switches (dual stacked boost). The first boost circuit is comprised of series switches Z4,Z5, diodes D5,D6, inductors L7,L8 and current sensor CS7. Alternately an additional current sensor may be provided in series with inductor L8. The magnitude of the current flowing in L8 may be calculated or inferred from the current flowing in the other inductors (L7, L9, L10) and as such this additional current sensor may not be required. Alternatives provide for using two, three, four or more stacked boost circuits in parallel. Plurality of stacked boost circuits, as used herein, is two or more stacked boost circuits arranged in parallel.

Switches Z4 & Z5 are controlled and switched ON & OFF at a switching frequency (10 Khz to 20 Khz or more, e.g.) with the ON time controlled or modulated by a control circuit as required to regulate the bus voltage while also controlling and regulating the current flowing in the inductors L7 & L8. Two pulse width modulation signals are provided to control Z4 & Z5 independently (PWM1 & PWM2). In general, control of these switches is similar to the well known boost circuit shown in FIG. 1, other than it may be desirable to phase stagger the two PWM signals or interleave the switching signals. Interleaving has a benefit of effectively doubling the ripple current frequency present in the inductors L7 & L8, which may allow reduction of the switching frequency of Z4 & Z5, reduce the filtering requirements and relative size of L7 & L8, along with other benefits. Other modifications of PWM1 and/or PWM 2 may be implemented as described in more detail below to provide bus voltage balancing and current balancing with a second boost circuit. The series arrangement of Z4 & Z5 along with diodes D5 & D6 result in a voltage impressed across these devices that is approximately one half Vbus. This may allow more efficient devices to be used and reduce or eliminate the need for snubbers, SVT or other circuits to reduce switching losses.

A second boost circuit is comprised of switches Z6,Z7 diodes D7,D8, inductors L9,L10 and current sensors CS9, CS10. The second boost output is connected in common with the first boost circuit to Vbus. The input is provided from a common rectifier. Alternately the second boost circuit may receive its input from a separate rectifier or other source of DC power. Switches Z6 & Z7 are controlled by two additional independent PWM signals (PWM3, PWM4). These two PWM signals may be similar to the two PWM signals provided to the first boost circuit. PWM3 & PWM4 may be interleaved in a similar fashion as PWM1 & PWM2. Operation of the second boost circuit is similar to operation of the first boost circuit. A more detailed description of the derivation and control of the four PWM signals is provided below. The dual boost circuit provides additional power flow through the pre-regulator by sharing the current flowing into Vbus, when compared to a single boost circuit.

A single stacked boost circuit arrangement for the pre-regulator is shown in FIG. 3. The description and operation is similar to the description given above for the first boost circuit as part of the dual boost arrangement. The control signals PWM1 & PWM2 are similar and may be interleaved as described above. Modification of PWM1 & PWM2 may be implemented to achieve bus voltage balancing. Modification of PWM1 & PWM2 for current balancing with a second boost however would not be required because there is no second boost circuit present. The control algorithm or circuit may be modified to eliminate the current balancing modification. As such it may be beneficial and desirable for a control to detect the configuration of the pre-regulator circuit (single boost, dual boost) so that control modifications may be automatically implemented. In general this arrangement of single boost compared to dual boost may reduce the total output boost current flowing into the DC bus such that this arrangement is suitable for a lower power welding power supply, or a welding power supply that can only operated from a reduced range of input voltages (ex. 400-600VAC, vs. 230-600VAC for a dual boost). This may allow a circuit with reduced complexity and cost for some applications that don't require a full range of input voltages for example. It may also be desirable to detect the pre-regulator arrangement (single boost, dual boost) and provide feedback to the user via an indicator, user interface, or other means as to the arrangement and the capability of this arrangement. For example a customer with a single boost arrangement may be alerted to an incorrect line voltage if the welding type power supply is connected to 230 VAC, and the single boost range is intended to be 400-600 VAC. It may therefore be desirable to detect the pre-regulator configuration to allow various configurations of welding type power supplies to be manufactured, to allow modifications in the field, retrofit, etc. and provide a control that can adapt and provide the necessary PWM control signals, as well as provide information to a user based on the detected configuration.

Figure 4:
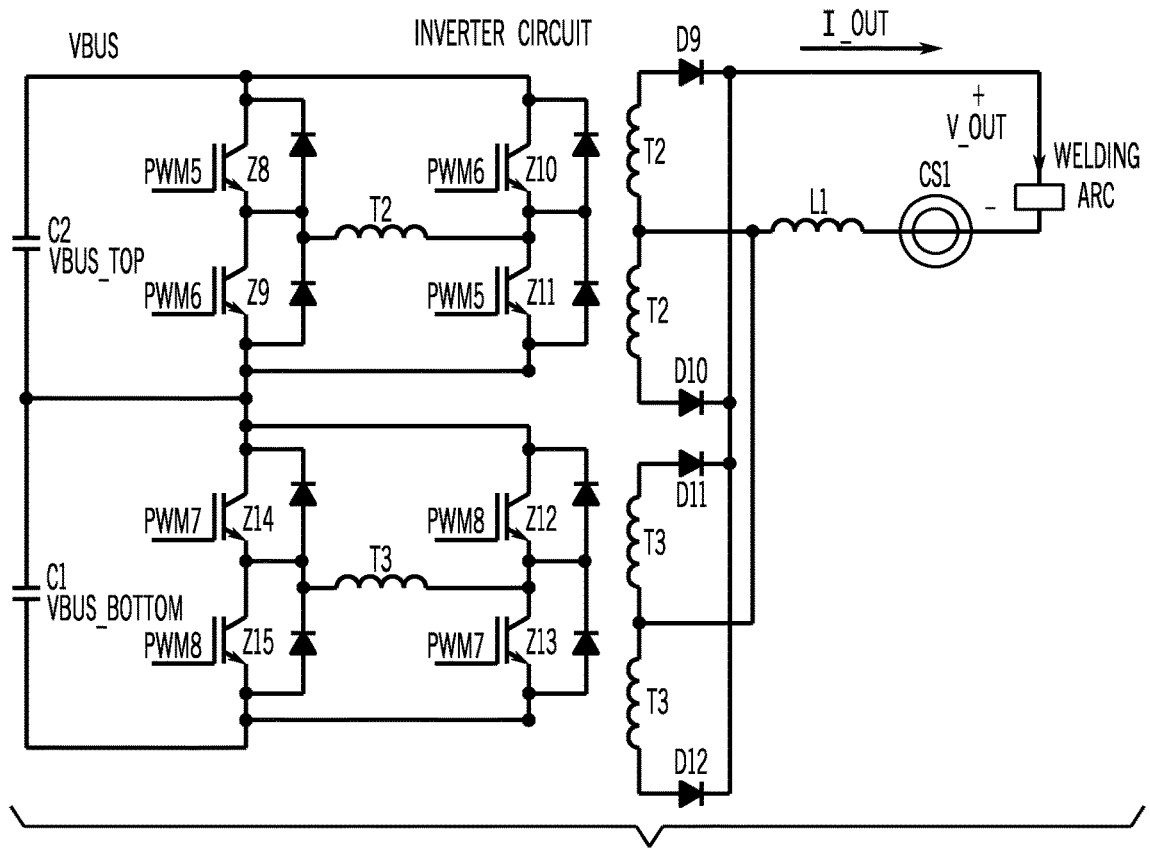
FIG. 4 is a dual stacked full bridge inverter output converter in accordance with the preferred embodiment.

A dual stacked full bridge inverter circuit is shown in FIG. 4. Switches Z8, Z9, Z10, Z11 transformer T2 and diodes D9,D10 form the basic power circuit for a first inverter circuit. Switches Z12, Z13, Z14, Z15 transformer T3 and diodes D11,D12 form a second inverter circuit. These two circuits are arranged in a series arrangement on the input or primary side with each connected across one half of the bus voltage (Vbus_top, Vbus_bottom). The output or secondary side is arranged in a parallel arrangement such that D9,D10 along with T2 share the output current with D11, D12 and T3. The switches are switched ON & OFF at a switching frequency (ex. 20 Khz to 100 Khz) with a pulse width or duty cycle that is modulated to control and regulate the output current and/or voltage as required to provide a welding type output. These pulse width modulation signals are indicated as PWM5, PWM6, PWM7 & PWM8. The basic operation of a full bridge circuit is well known and will not be described further other than specific details as it relates to the control of the PWM signals. Dual stacked inverter, as used herein, is two stacked inverters connected in to have their outputs in parallel. Alternatives provide for a series connection, which will result in a higher output voltage. The preferred embodiment has, on the input side, for a single inverter with there are 4 switches in series across the two series bus voltages with a single transformer. For a dual inverter, 4 switches arranged in a full bridge driving the primary of one transformer connected across each bus voltage with the two bus voltages in series.

As with the stacked boost circuit, the stacked full bridge arrangement may allow the use of lower voltage switches as the primary of each inverter circuit operates from one half of the total bus voltage. In addition the stacked arrangement shown in FIG. 4 has some benefit in that there is an inherent means to split and share the current on the secondary and naturally force an approximate balancing of the two bus voltages on the primary (VBus_top & Vbus_bottom). For example if the top bus voltage is higher than the bottom bus voltage then the secondary voltage of T2 will be higher than the secondary voltage of T3 and therefore T2 will take a greater proportion of the output current. This additional current reflected to the primary of T2 means that the total power drawn from the top bus voltage will be greater than the power drawn by the lower inverter circuit on the bottom bus. This greater power will naturally decrease the top bus voltage relative to the total bus voltage until an equilibrium point is reached. Thus there is passive balancing or sharing. Active balancing or sharing may be desired for certain dynamic or static load conditions such as for very small PWM values, such as during a short circuit condition on the output of the welding type power supply. Active balancing of the top and bottom bus voltages may be performed independently or in conjunction with a voltage balancing means implemented in the control for a single or dual stacked boost pre-regulator.

The inherent balancing of the series bus voltages, and sharing of output current may perform optimally with a small mismatch in the top and bottom bus voltages (ex. 2 to 3 volts difference), as naturally arrived at by the tolerances of the various circuit components within the inverter circuit, switching characteristics, etc. As such it may be desirable to disable active DC bus balancing within the pre-regulator circuit once the bus voltage difference falls below a limit (ex. within 5 Volts differential).

In some arrangements of a welding, cutting or heating power supply the secondary diodes D9, D10, D11 & D12 may be eliminated and the high frequency AC of T2 & T3 used directly. Other arrangements may include further processing of the output power through an AC inverter circuit to provide an AC output power with a frequency that may be independent of the inverter switching frequency and independent of the AC line frequency. Any number of other additional circuits and controls may be provided as required within a welding type system such as thermal sensors, fan control, user interfaces, weld process controls, data storage, wire feeders, aux. power supplies, etc.

Figure 5:
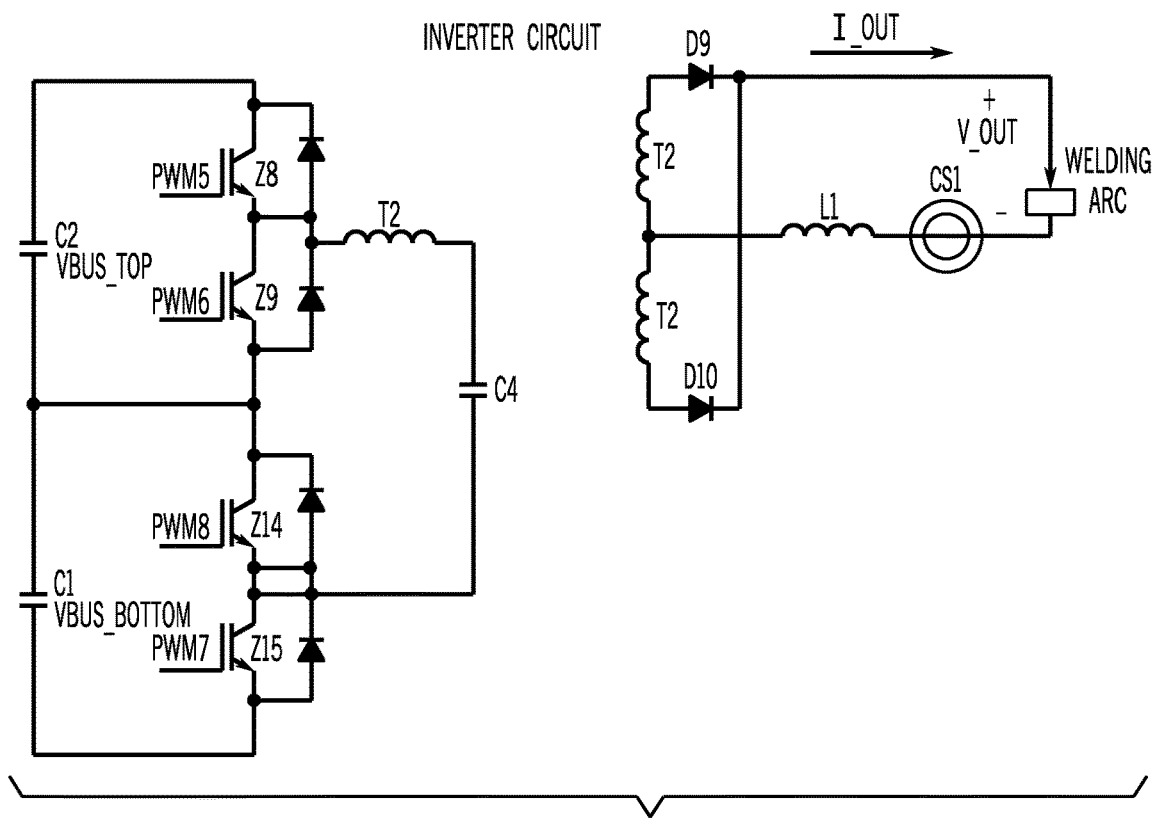
FIG. 5 is a stacked full bridge inverter output converter in accordance with the preferred embodiment.

A stacked full bridge inverter circuit is shown in FIG. 5. The basic inverter circuit is comprised of switches Z8, Z9, Z14 & Z15 along with transformer T2, blocking capacitor C4 and diodes D9,D10. Switches Z8, Z9, Z14 & Z15 are controlled by PWM signals PWM5, PWM6, PWM7 & PWM8. In this arrangement switches Z8 & Z15 are switched more or less together and switches Z9 & Z14 are switched ON and OFF together. Capacitor C4 maintains a DC offset voltage approximately equal to one half Vbus. In general, operation of this arrangement of full bridge circuit is similar to the operation of one of the two full bridge inverter circuits shown in FIG. 4, with the main difference being that when switches Z9 & Z14 are ON, the voltage across primary of T2 and thus the output power, is supplied by the voltage stored on blocking capacitor C4.

Figure 6:
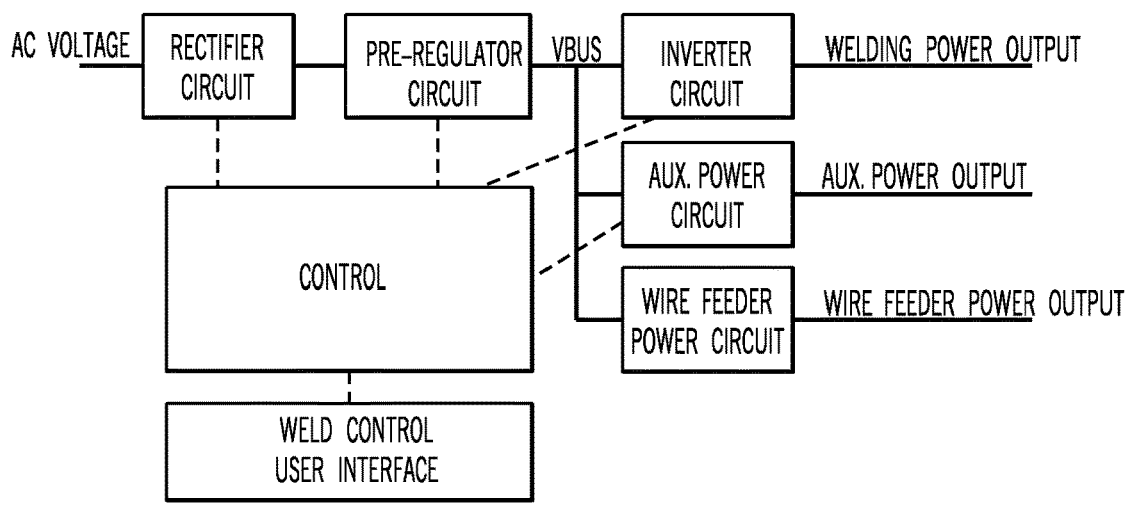
FIG. 6 is a block diagram of a welding-type power supply in accordance with the preferred embodiment.

A basic system block diagram of the described welding type power supply is shown in FIG. 6. AC line voltage is supplied to a rectifier circuit followed by a pre-regulator circuit. A regulated bus voltage (Vbus) is provided by the pre-regulator to an inverter circuit, which in turn provides a welding type power output. An aux. power circuit may also be powered from the Vbus signal and provide an aux. power circuit. For example the aux. power circuit may provide 115VAC in the form of a rectangular waveform or a sine waveform or other suitable waveform. The aux. power circuit may be used in a welding type system or cell to power various hand tools, grinders, fans, lights or other ancillary equipment that may be found in a weld cell. The aux. power circuit may or may not be present in some welding type power supplies. A wire feeder power circuit may also be powered from the Vbus signal and provide an output power signal for driving a wire feeder as part of a welding system. The wire feeder power output may be a DC signal such as 42 VDC, or may be an AC signal in other systems. Again the wire feeder power circuit may or may not be present in some welding type power supplies depending on the particular configuration. Other similar power circuit such as for powering a water cooler, heater, etc. may be provided in a similar fashion.

A control may receive input signals and/or provide various control signals to control the pre-regulator circuit, inverter circuit and any additional power circuits as shown in FIG. 6. These signals may include current and voltage feedback signals, PWM signals, enable and status signals, analog feedback signals, etc. In other words all of the necessary signals as required to monitor and control the power circuits. The control may also interface to additional controls and/or circuits such as a weld control, user interface, etc. as required for proper operation of the welding type power supply within a welding operation. The control may be implemented using control circuits, microprocessors and memory devices, software algorithms, or various combinations.

Figure 7:
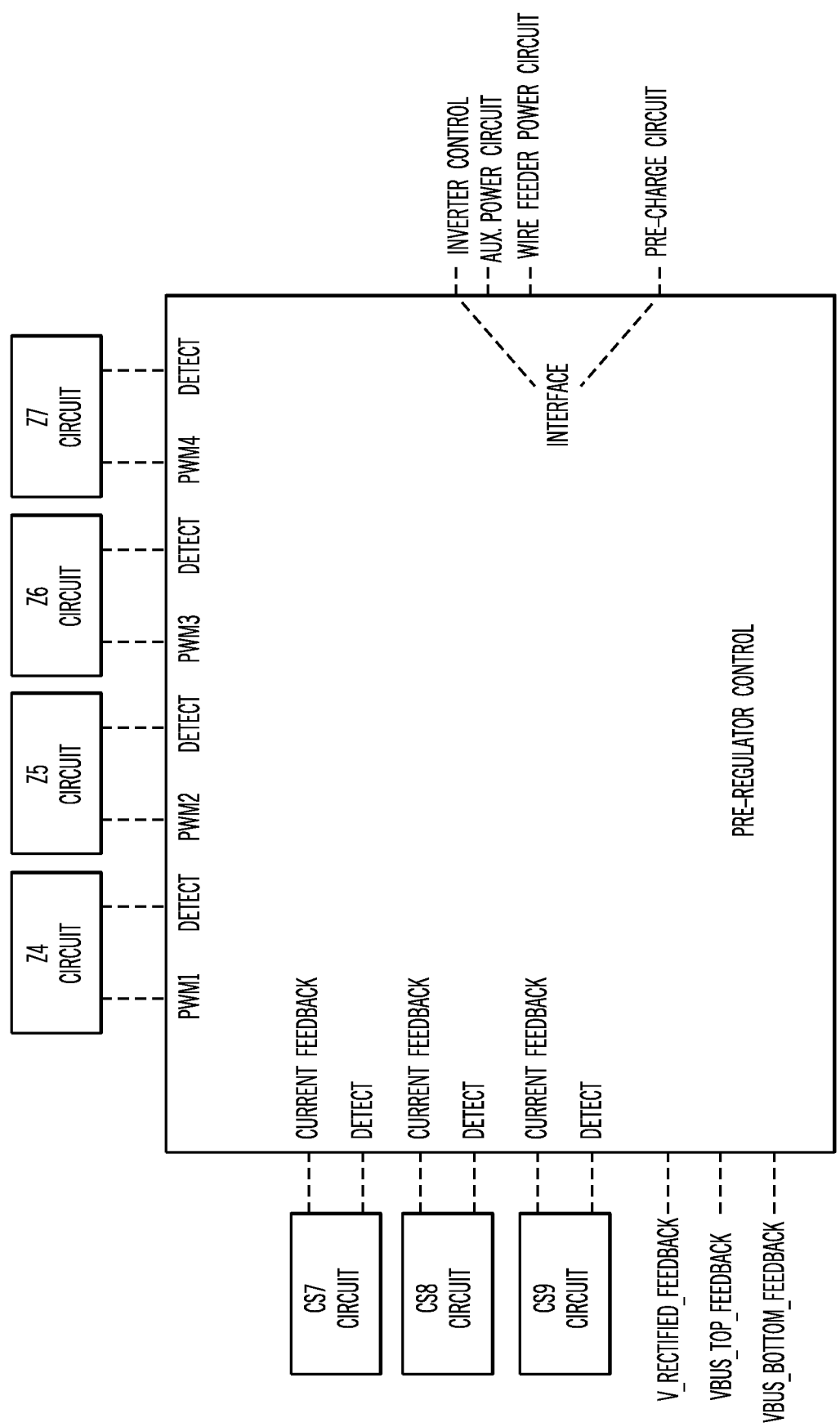
FIG. 7 is a controller for a pre-regulator in accordance with the preferred embodiment.

A pre-regulator control block diagram is shown in FIG. 7. Each of the four switch circuits (Z4, Z5, Z6, & Z7) are provided with a PWM control signal generated by the pre-regulator control, and a detect signal provided to the pre-regulator control to allow for the control to detect the presence or lack of presence of the switch circuits. Each switch circuit may contain a power semiconductor such as an IGBT, gate drive circuit, thermal feedback, or other circuits. The detect signal may be an analog feedback signal or a logic signal that can be read or detected by the pre-regulator control to sense the presence of each particular switch circuit. As described above the pre-regulator control may alter a control sequence or algorithm based on the presence or lack of presence of one or more of the switch circuits. For example if the control detects the presence of four switch circuits then a current balancing control may be implemented to balance the current flowing in the four inductors shown in FIG. 2. Interface signals may be provide to a user interface or other control to indicate the configuration of the welding type power supply. The switch detect signals may also be used to detect and indicate an abnormal situation or possible welding type power supply fault. For example if the pre-regulator control detects the presence of 3 of the 4 switch circuits, this may be indicated as a fault to the user, and an indication provided as to which switch was not detected as an aid for servicing the welding type power supply.

Likewise the three current sensors may be connected to the control as shown to provide a current feedback signal indicative of the current flowing in three of the inductors shown in FIG. 2. The current sensors may also provide a detect signal to the control, so that the presence or lack of presence of the current sensors can be detected. In a pre-regulator circuit within a welding type power supply it is often desirable to control the pre-regulator current in some fashion, to limit the current, to shape the current waveform to improve the power factor, to limit the input power or output power from the pre-regulator circuit, etc. Utilization of the current detect signal to modify the control or disable operation if the current sensor is not detected can help assure proper operation, and/or assist with servicing of the welding type power supply. Alternately the presence of the current sensors may be detected by looking for a certain threshold of current feedback during operation or start up of the pre-regulator circuit. For example a start up sequence may operate the boost pre-regulator circuit for a certain time period with a small PWM duty cycle value, such that the current cannot climb too rapidly beyond a certain limit, yet allow detection that the sensor is providing a feedback signal. Alternately the expected current feedback signal may be calculated based on the input rectified voltage supplied to the pre-regulator circuit, the output bus voltage, the switch PWM duty cycle values and the inductor values, and this value compared to the actual current sensor feedback signals to determine proper operation of the current sensors. Additional signals not shown may be provided to the current sensor circuit such as power supplies, or other signals required for proper operation.

The pre-regulator control may also be supplied with other signals such as a feedback signal indicative of the rectified voltage (V_RECTIFIED_FEEDBACK) and bus voltage feedback signals (VBUS_TOP_FEEDBACK, VBUS_BOTTOM_FEEDBACK). These signals may be used to regulate the bus voltage, implement DC bus balancing between top and bottom bus voltages, detect a bus voltage unbalance and take some action to correct or disable operation, verify proper input voltage based on a detected pre-regulator configuration, or other features and functions. The bus balancing is accomplished by a bus voltage balancing module that receives the bus voltage feedback signals, and causes the switches to operate in such a way as to bring them closer together. Bus voltage balancing module, as used herein, is a control module that controls switching signals so as to balance a bus voltage across multiple capacitors.

Various interface signals may be provided to the inverter control, aux. power circuit, wire feeder power circuit, pre-charge circuit, and other circuits within a welding type system. These interface signals may be provided as outputs by the pre-regulator control or as inputs to the pre-regulator control. These interface signals allow for detection of the presence of certain circuits such as an aux. power circuit for example and then to take some action based on the presence or lack of presence of certain circuits. For example if an aux. power circuit is detected as present, then a power up routine for the aux. power circuit may be activated as part of the overall power up routine of the welding type power supply. The aux. power circuit may be enabled for example only after the pre-regulator has established Vbus at its nominal regulated value and determined that it is ok to enable the aux. power circuit. After a certain power up time the pre-regulator control may then verify operation of the aux. power circuit, and either continue operation or disable operation depending on a detected status of the aux. power circuit. This status and operational information may be communicated to a user via a user interface.

It may be desirable to limit the total input power or current to the welding type power supply in some situations. As such it may be desirable to reduce or limit the maximum welding type output power if an aux. power circuit is present. For example if an aux. power circuit that can provide up to 2 kw of output power is detected as part of the configuration of the welding type power supply it may be desirable in some situations to reduce the maximum welding output power by 2 kw or some amount such that the input power does not exceed an upper limit. In addition it may be desirable to modify the control of a cooling fan based on detecting the presence of an aux. power supply configuration, or based on an output power level of an aux. power supply. This may allow for adequate cooling of aux. power supply components during periods when welding power output is at a reduced limit. The aux. power circuit is detected in the manner described above for detecting other circuits using an auxiliary power circuit detection module. Auxiliary power circuit detection module, as used herein, is a control module that detects the presence of, or use of, an aux. power circuit.

The detection modules can provide configurations to a user-notification module, which can notify the user of the configuration, or only notify the user when there is an error detected. User-notification module, as used herein, is a control module that acts to notify the user of a condition or parameter.

A pre-charge circuit interface may also be provided to allow for the bus capacitors to be soft charged or pre-charged prior to operation of the boost circuit. A relay or AC line contactor, or other means as is well known may be used as part of a pre-charge circuit. The interface signals may contain additional information beyond detect, enable and status. For example DC bus voltage signals or information may be provided to the inverter control, such that the inverter control may take some action to work in conjunction with the pre-regulator control to force a DC bus balance. Any number of other signals may pass back and forth between these and other parts of the welding type power supply. These signals may be in the form of hardware connections, variables in software, serial communication, or any other suitable form.

Figure 8:
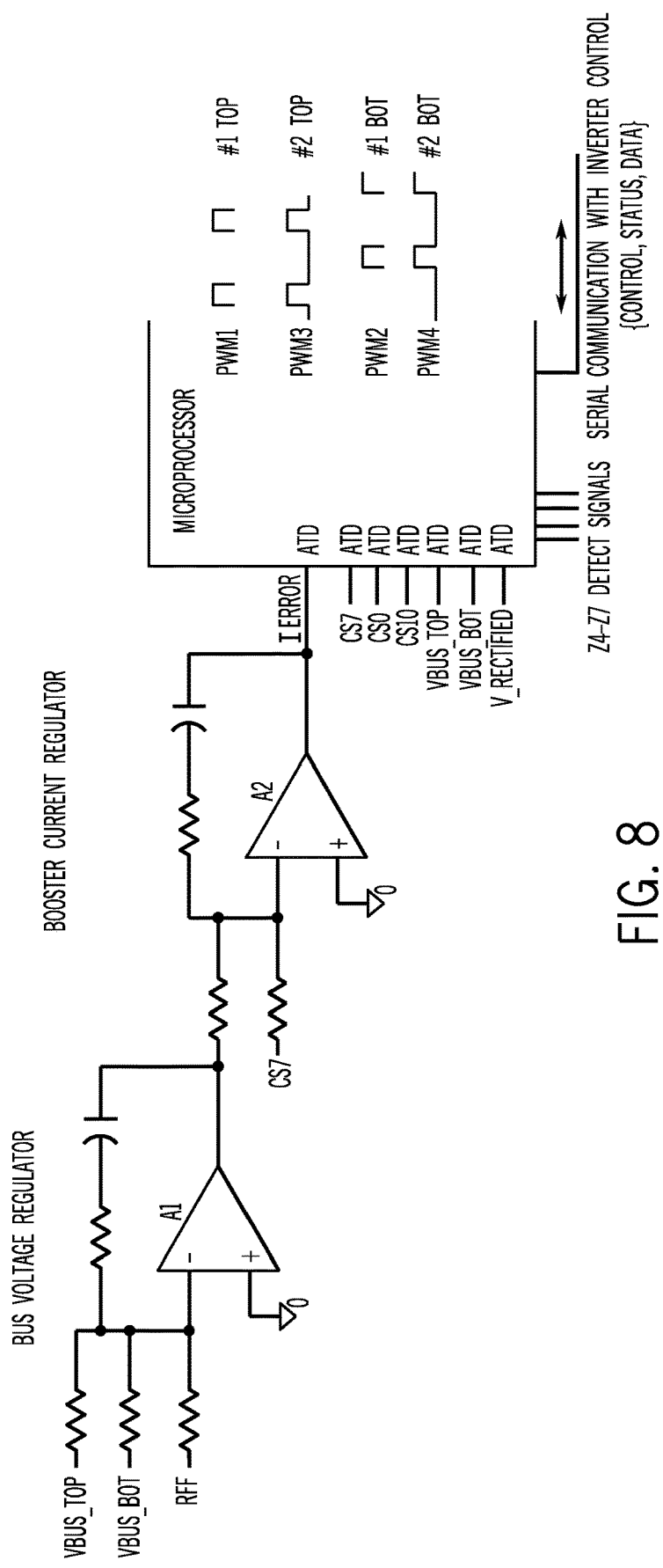
FIG. 8 is a controller for a stacked boost pre-regulator circuit in accordance with the preferred embodiment.

An example control circuit for a stacked boost pre-regulator circuit that can accommodate a single or dual boost arrangement is shown in FIG. 8. Circuit A1 is a bus voltage regulator circuit that provides an output signal to a boost current regulator circuit. The output of the bus voltage regulator circuit serves the purpose of regulating the total bus voltage to a fixed value (REF), based on feedback signals (VBUS_TOP & VBUS_BOT). For some welding type power supplies that require a range of dynamic welding processes such as pulse welding it may be desirable to tune the compensation network of the bus voltage regulator so that the power flow out of the pre-regulator tends to be more responsive to the average welding power requirement and not the dynamic nature of the welding process. This may require a compensation network that provides a relatively slow response (ex. 50 to 100 mSec).

Circuit A2 is a boost current regulator circuit that serves the purpose of regulating the boost current based on a current feedback signal (CS7). The output of the current regulator (I_ERROR) is read as an analog input by a microprocessor and is used as one input to determine a PWM duty cycle for the four boost switches (PWM1-PWM4). For example PWM1-PWM4 may be identical initially based on the value of I_ERROR.

Additional analog and digital inputs are provided to the microprocessor. These include analog current sensors signals (CS7, CS9 & CS10) that provide feedback information proportional to the current flowing in the inductors shown in FIG. 2. Analog bus voltage feedback signals (VBUS_TOP, VBUS_BOT) are also read by the microprocessor and may be used as another input to modify a PWM duty cycle (PWM1-PWM4) to actively balance the two DC bus voltages. A feedback signal representative of the rectified voltage provided to the pre-regulator circuit by the input rectifier (V_RECTIFIED) may also be provided. This feedback signal may be used in various ways such as for detecting an input voltage that is too high or too low for a particular pre-regulator configuration, detecting single phase power, etc. In some cases the rectified voltage feedback may be used to modify the PWM values such that the input current is shaped and aligned with the input AC line voltage to further improve power factor.

Z4-Z7 detect signals are provided to the microprocessor and may be used to determine the boost configuration or arrangement (single or dual), and also detect an abnormal condition. Certain control and status information is communicated with an inverter control via a serial communication circuit. Additional signals may be provided that are not shown such as rectified voltage feedback, thermal sensors, etc. A circuit may alternately be inserted between the voltage regulator output and the current regulator to provide further improved power factor by shaping the voltage regulator output to more closely follow the wave shape and alignment of the AC line voltage supplied to the rectifier. A multiplier or other circuit may be used for this purpose.

The following illustrates one way the Z4-Z7 detect signals may be used:

Z4&Z5&Z6&Z7 detected–configuration=DUAL BOOST    1)

Z4&Z5 detected–configuration=SINGLE BOOST    2)

Any other combination detected=FAULT, disable boost and/or take other action.    3)

A DC bus difference signal may be generated and utilized to generate a bus balancing duty cycle term that can be used to modify one or more of the pre-regulator PWM signals. The following illustrates one method of implementing a DC bus balancing algorithm, taking into account the detected configuration of the power circuit.

BUS_DIFF=$V$bus_top−$V$bus_bot    1)

If magnitude BUS_DIFF>Fault_limit then FAULT, disable boost and/or take other action.    2)

If magnitude BUS_DIFF<Correction_lower_limit, then reset BUS_ERROR and disable bus balancing.    3)

Otherwise accumulate a BUS_ERROR term:
BUS_ERROR=BUS_ERROR+BUS_DIFF    4)

If BUS_ERROR>0 this indicates top bus voltage is too high.    5)

If configuration=DUAL BOOST, then
PWM1=PWM1+$K$*BUS_ERROR,
PWM3=PWM3+$K$*BUS_ERROR.    6)

If configuration=SINGLE BOOST, then
PWM1=PWM1+$K$*BUS_ERROR Similarly if BUS_ERROR<0, this indicates bottom bus voltage is too high.    7)

If configuration=DUAL BOOST, then
PWM2=PWM2−$K$*BUS_ERROR,
PWM4=PWM4−$K$*BUS_ERROR.    8)

If configuration=SINGLE BOOST, then
PWM2=PWM2−$K$*BUS_ERROR    9)

A gain term or scaling term may be applied to BUS_ERROR (K) to provide for the correct scaling as applied to the PWM signals. Additionally the magnitude of BUS_ERROR may be limited to some upper limit, whereby further accumulation of DC bus error is ignored. An accumulating bus error function or integrator may be desirable such that a large BUS_ERROR term can be derived to force a large mismatch between upper and lower switch PWM values while maintaining a small magnitude of bus voltage difference.

In some situations such as at reduced output power levels of the welding power supply, the power output and current levels of the pre-regulator circuit are at relatively low levels. For these conditions and more particularly when the rectified input voltage is less than either the top or bottom bus voltage it may be necessary to develop a large BUS_ERROR term to effectively provide a bus balancing mechanism. For other power levels and rectified voltage levels a small BUS_ERROR term may effectively force a DC bus balance. Further DC bus correction may be disabled once the bus voltage difference falls below a lower correction limit (ex. 5 Volts). This may be desirable to provide a means for the inverter circuit to arrive at a natural equilibrium operating point with a small bus voltage mismatch, as described above. In addition it may be desirable to reset an accumulating bus error term or integrator so that, when bus balancing is once again required and activated within the pre-regulator control, the bus error term is not already at a an undesirable or incorrect value.

If the bus voltage difference is less than the fault_limit (ex. less than 50 Volts difference) but greater than a correction upper limit (ex. 10 Volts difference), then a further DC bus correction scheme may be implemented by communicating with the inverter control, such that the inverter control make take additional action to assist in balancing the DC bus voltages. One method is for the inverter control to increase the PWM duty cycles of the inverter that is operating on whichever DC bus has the greater magnitude. For example if the top bus voltage is too high relative to the bottom bus voltage then the inverter control may increase the PWM duty cycle of the upper inverter by some fixed or variable duration (ex. 0.5 μsec). Once the magnitude of the DC bus difference falls back below an upper correction limit then this may be communicated to the inverter control and this supplemental DC bus balancing disabled, or return the inverter PWM values back to their normal operating values. An alternative implementation may provide DC bus balancing coordination with an aux. power supply, control power supply or other power circuit that can selectively draw more or less power from either the top or bottom bus.

A current balancing control system may also be implemented for a dual boost circuit to achieve current balancing in the four inductors as shown in FIG. 2. Current balancing may be desirable to actively force the 4 inductor currents (and subsequently the four switch currents) to more or less match. Without active current balancing a mismatch in the four currents can occur due to circuit differences and tolerances, (such as gate drive, inductor differences, etc.) Again the pre-regulator control may utilize the detect signals (Z1-Z4) to detect a DUAL boost configuration and automatically implement the current balancing control. If a SINGLE boost configuration is detected then the current balancing portion of the pre-regulator control may be disabled. For SINGLE boost operation there are only two inductors and the currents are naturally matched.

In general current balancing is performed as follows. The two upper branch currents (L7 & L9) are compared, the PWM value of whichever upper branch has greater current is reduced by a value proportional to the current difference. The two lower branch currents (L8 & L10) are then compared, and the PWM value of whichever lower branch has greater current is reduced by a value proportional to the current difference. The balancing of the two lower branch currents can be accomplished with only one additional current sensor (CS10), by utilizing the fact that the sum of the two lower branch currents must equal the sum of the two upper branch currents. Therefore the desired or target current for each lower branch is one half of the sum of CS7 & CS9.

Alternately four current sensors could be utilized to determine the four branch currents. If DUAL BOOST:

$$\text{Upper\_current\_error} = CS7 - CS9 \qquad 1)$$

$$\text{If Upper\_current\_error} > 0 \text{ then } PWM1 = PWM1 - K2 * \text{Upper\_current\_error} \qquad 2)$$

$$\text{If Upper\_current\_error} < 0 \text{ then } PWM3 = PWM3 + K2 * \text{Upper\_current\_error} \qquad 3)$$

$$\text{Lower\_current\_error} = (CS7 + CS9)/2 - CS10 \qquad 4)$$

$$\text{If Lower\_current\_error} > 0 \text{ then } PWM2 = PWM2 - K2 * \text{Lower\_current\_error} \qquad 5)$$

$$\text{If Lower\_current\_error} < 0 \text{ then } PWM4 = PWM4 + K2 * \text{Lower\_current\_error} \qquad 6)$$

Alternately the four branch currents could be controlled in a manner to actively force a percentage difference to account for differences in cooling for example between the four different switches (Z1-Z4) or for other reasons. This could be accomplished by scaling the current feedback signals with different constants to force a percentage difference. For example the Upper_current_error may be calculated as follows:

$$\text{Upper\_current\_error} = CS7 - K3 * CS9 \text{ (ex. } K3 = 1.2) \qquad 1A)$$

This new Upper_current_error could then be used to adjust one of the two upper PWM values (PWM1, PWM3) as before.

Likewise the two lower branch currents could be controlled in a similar fashion to force a percentage difference. The two lower branch currents need not be controlled with the same percentage difference as the two upper. In this way the power circuit could be optimized based on a particular power component and cooling arrangement.

Further alternatives could be utilized to actively balance the branch currents as described above, either to be the same or some percentage difference. One alternative would be to provide one or more additional boost current regulators as shown in FIG. 8, using the other current feedback signals (CS8, CS10). These additional current regulators could be connected to a common bus voltage regulator and used to generate additional I_error signals, that could then be used as additional inputs to set the PWM signals.

Further modifications or limits may be applied to one or more of the PWM signals for the pre-regulator (PWM1-PWM4). For example the duty cycle value may be clamped or limited to an absolute minimum or maximum value. Additionally a start up duty cycle limit may also be implemented so that for some duration as the pre-regulator is powering up and charging the bus voltage to its target value, the maximum duty cycle is further limited. During this time interval the pre-regulator control may test the values of CS7, CS8 and/or CS10 to determine if the current sensors are providing valid feedback signals.

Figure 9:
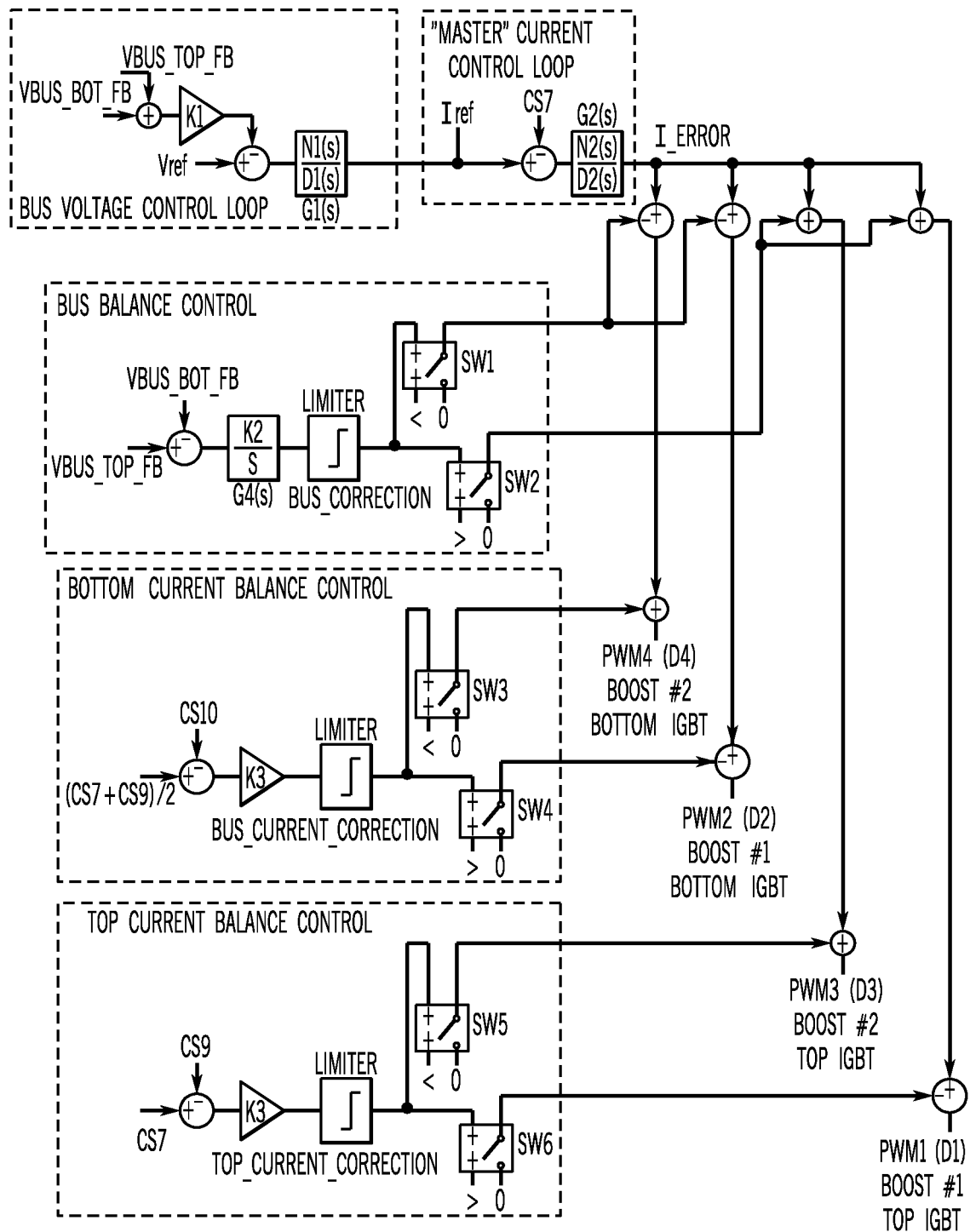
FIG. 9 is a control loop for a dual stacked boost pre-regulator circuit in accordance with the preferred embodiment.

FIG. 9 shows a control loop model of a dual stacked boost pre-regulator circuit with a bus voltage balancing loop and upper and lower current balancing loops.

A bus voltage control loop sums feedback signals representing the top and bottom bus voltages. A gain factor is applied (K1) and the result subtracted from a reference or set voltage (Vref). The difference is applied to a compensation network represented as G1(s) in the Laplace domain. The output of the compensation network is a current reference command (Iref), that is an input to the master current control loop. Current feedback signal (CS7) is subtracted from Iref and applied to a current loop compensation network, G2(s). The output of the current control loop is an error signal (I_ERROR) which is used to set the values for the four PWM signals (PWM1-PWM4). Alternately another block may be inserted between the voltage control loop output (Iref) and the current loop input to further improve the power factor by shaping the Iref signal to more closely follow the shape and phase of the input AC voltage. A multiplier function with the second input providing a reference waveform indicative of the desired waveform may be used for this function.

A bus balance control loop subtracts the bottom bus voltage feedback from the top. The difference is applied to an integrator or compensation network, G4(s). A limiter function limits the upper and/or lower limits. Switch SW1 applies the negative bus correction factor to the PWM signals for the lower switches (PWM2, PWM4). Switch SW2 applies a positive bus correction factor to the PWM signals for the two upper switches (PWM1, PWM3). Switches SW1 & SW2 may remain disconnected whenever the bus voltage difference falls below a threshold.

A bottom current balance current control loop subtracts current feedback CS10 from a target current value determined as the average of CS7 & CS9. A gain factor is applied (K3), and the result applied to a limiter function. The limiter may limit the upper and/or lower limits. Switch SW3 applies a negative bottom current correction factor to PWM4 signal. Switch SW4 applies a positive bottom current correction factor to PWM2. The current balancing loops are part of a current balance module. Current balance module, as used herein, is a control module that balances current flow in multiple circuit paths.

A top current balance control loop subtracts feedback signals CS7 & CS9 representing the two upper branch currents. A gain factor (K3) is applied and the result applied to a limiter function. The limiter may limit the upper and/or lower limits. Switch SW5 applies a negative bottom current correction factor to PWM3 signal. Switch SW6 applies a positive bottom current correction factor to PWM1.

A power up sequence may be implemented that is dependent on a detected configuration. For example the power up sequence may be adapted based on detecting the presence or lack of presence of an aux. power supply or a wire feeder power supply. Likewise a power down sequence may be modified based on a detected configuration. Start up module, as used herein, is a control module that acts to start a power circuit in a desired manner. Power down module, as used herein, is a control module that acts to power down a power circuit in a desired manner.

The following illustrates one possible power up sequence:

1) Pre-charge delay (allow initial charging of DC bus capacitors)
2) Self checks—verify SINGLE/DUAL boost configuration, verify current sensor signals present, verify correct combination of Z1-Z4, etc. Improper configuration=FAULT, don't proceed with power up sequence. Other self-checks may be incorporated.
3) Verify Vbus_top, Vbus_bottom based on Vrectified. Each bus capacitor should charge up to approximately ½ of Vrectified for example.
4) Enable Pre-charge relay or contactor to bypass a pre-charge resistor.
5) Enable boost pre-regulator circuit, soft-start mode (limit maximum PWM duty cycle, maximum current, etc.).
6) Boost delay time
7) Verify boosted DC bus voltage (Vbus_top, Vbus_bot)
8) If aux. power circuit detected:
8A) Enable aux. power circuit.
8B) Aux. power up delay.
8C) Aux. power circuit verification (is it operating properly), if not then disable and indicate to user and/or take other action.
8D) Calculate maximum power available for weld power output based on power consumed by aux. power.
9) If wire feeder power circuit detected:
9A) Enable wire feeder power circuit.
9B) Wire feeder power circuit delay for power up.
9C) Wire feeder power circuit verification (is it operating properly), if not then disable and indicate to user and/or take other action.
10) Enable inverter circuit to provide welding power output.

Figure 10:
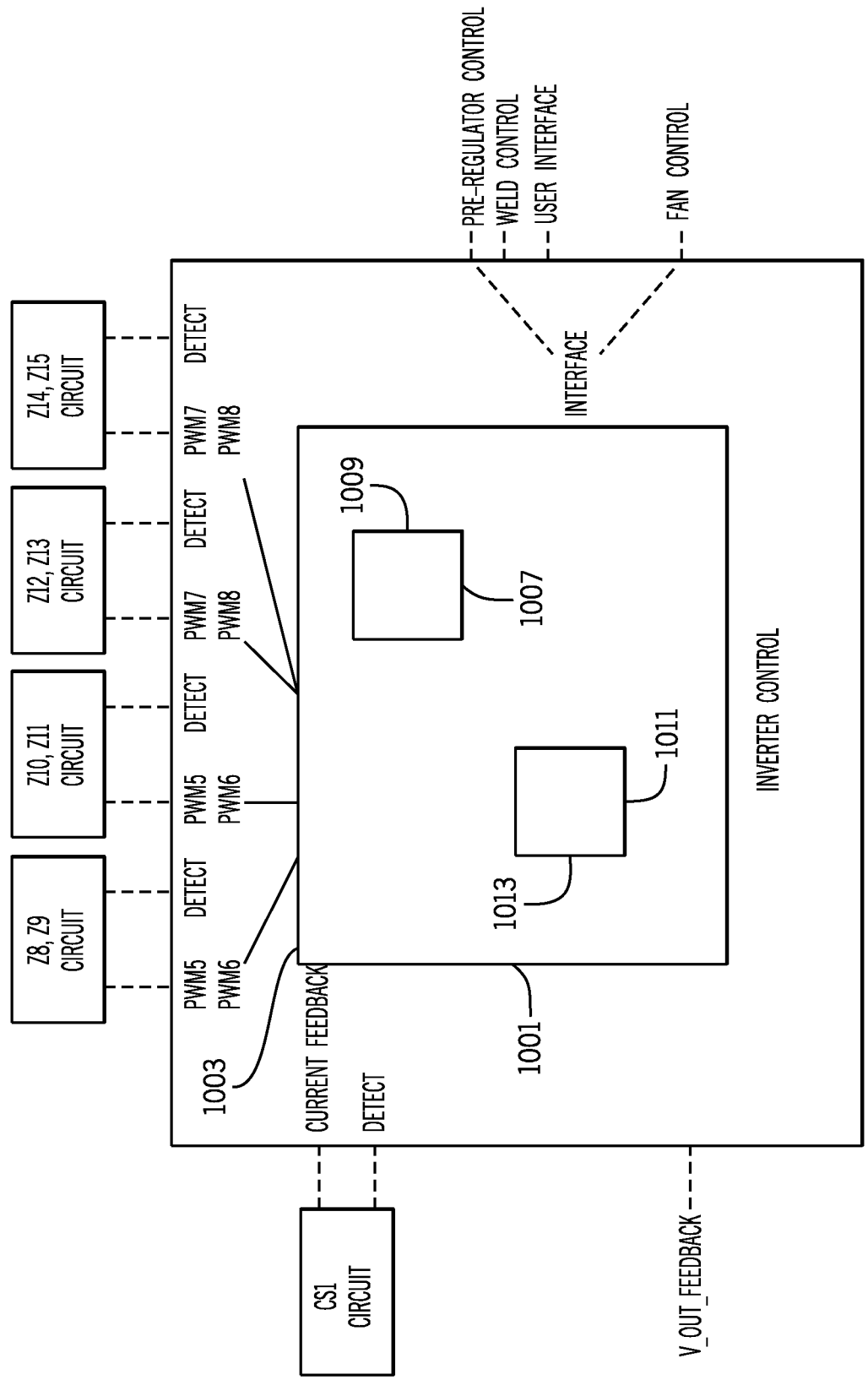
FIG. 10 is a controller for an inverter-based output converter in accordance with the preferred embodiment.

An inverter control block diagram is shown in FIG. 10. The switch circuits (Z8-Z15) are provided with PWM control signals to control the duty cycle of the switches based on various inputs and controls to effectively generate a welding type power output. The switch circuits may be grouped as shown or individually, and provide one or more detect signals to the inverter control. These detect signals may be used in a similar fashion as was described for the pre-regulator control. For example combinations of certain detect signals could indicate a dual stacked full bridge power configuration as shown in FIG. 4, or a stacked full bridge configuration as shown in FIG. 5. As such the inverter control may modify how the PWM signals are generated are controlled based on this detected configuration. Abnormal combinations of detect signals could generate a fault that disables operation of the inverter circuit. This fault could be communicated to the pre-regulator control to take further action such as disabling the pre-regulator circuit.

The inverter control may also be supplied with current and voltage feedback or other feedback signals as required to generate a welding type power output. A weld control for example may require certain current or voltage waveforms to produce a weld. The inverter control may use the feedback signals to produce the required waveforms. Additional interface signals may be provided to communicate with other components within the welding type power supply or system as required, such as weld control, user interface, pre-regulator control, etc.

In addition a fan control signal may be generated to control one or more cooling fans. The fan control signal may be modified or controlled based on a detected arrangement of the inverter power circuit, and/or the pre-regulator circuit. For example a dual stacked boost may be detected for the pre-regulator circuit, and a dual stacked full bridge circuit detected for the inverter. Based on this detected configuration a fan may be operated at a maximum speed. For another configuration the fan may be operated at a slower speed. An AC fan (ex. 115VAC) may be used for cooling, and the speed controlled by varying the frequency of the voltage supplied to the fan (Ex. 50 Hz for slow, 60 Hz for fast). This AC signal may be synthesized by a well known AC H-bridge circuit or other similar circuit. In addition or alternately the speed or control of the fan may be modified based on other inputs such as a current feedback signal (CS1 for example), a thermal sensor, ambient temperature or other inputs.

Figure 11:
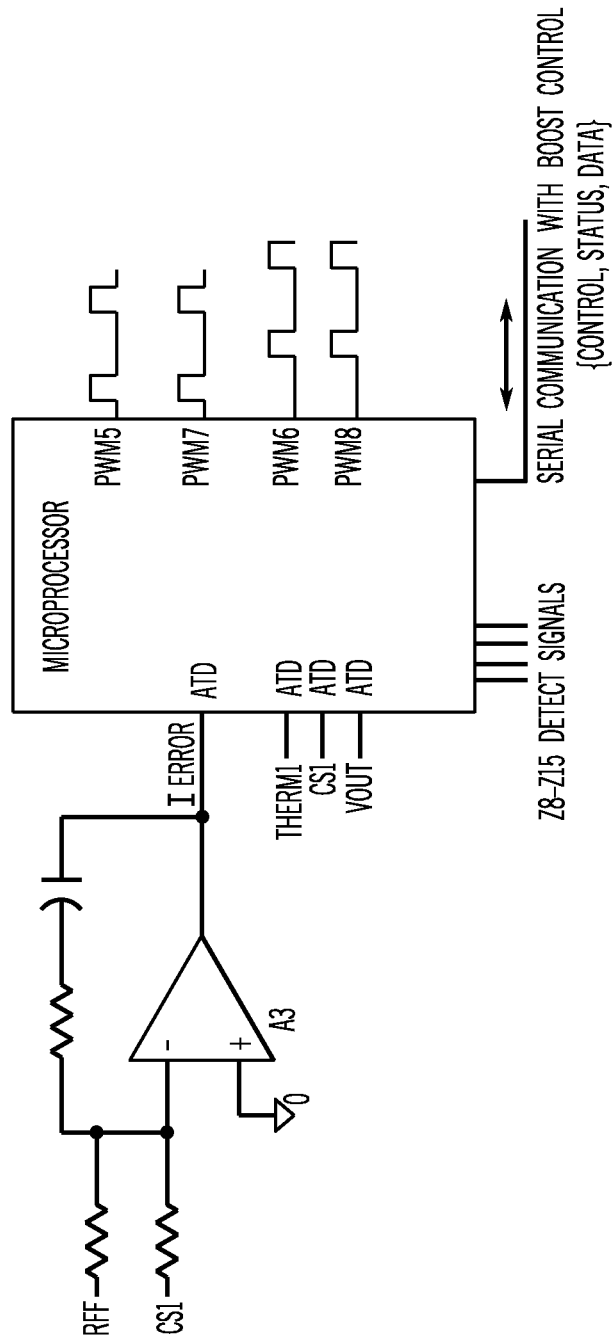
FIG. 11 is a controller for an inverter-based output converter in accordance with the preferred embodiment.

A simplified inverter control circuit is shown in FIG. 11. Circuit A3 is a current regulator circuit that accepts a reference signal (REF) and a current feedback signal (CS1) and generates an error signal (I_ERROR). The reference signal may be generated by a weld process control or other means and provide a set level or reference welding waveform that is responsive to conditions in the welding arc. Some welding processes are very dynamic with complex reference waveforms and arc conditions that can vary rapidly from a short circuit to an open arc condition. As such the current regulator is normally fast enough to respond to the required changes to produce a desirable weld condition. As such the error signal (I_ERROR) may vary rapidly as required to control the PWM signals for the inverter switches and thus control the output of the inverter.

A microprocessor may read the analog value of I_ERROR and act upon it to generate the necessary PWM signals. Four unique PWM signals may be required to control the dual stacked full bridge inverter circuit. Various other analog and digital signals may interface with the microprocessor as required to control the inverter as well as interface with the other components within the welding type power supply or system. Z8-Z15 detect signals may be incorporated as described above to detect a power circuit configuration, or abnormal condition. In addition an interface may be provided to the boost pre-regulator control. This interface may provide information or signals to coordinate DC bus balancing in conjunction with DC bus balancing actions performed by the boost pre-regulator control. In some situations as described above, it may be desirable for the inverter control to take action to assist in maintaining a DC bus balance. Additional signals, control and circuits not shown may be incorporated such as a fan control as described above.

One alternative algorithm to balance the bus may includes using proportional gain to actively balance the top and bottom bus halves through pulse width correction implemented using a bus balancing module. The top and bottom bus voltages are fed to an ADC and sampled at a 40 ksps rate, and fed to a 1 msec software IIR filter. A voltage difference between the top and bottom bus filter averages is calculated. If the difference is less than 10V there is no pulse width correction for bus balancing (the top and bottom pulse widths are equal). If the difference is between 10V and 20V then the top or bottom pulse width (whichever bus is higher) is increased from +0.5 usec to +1.5 usec (a 10 V difference results in a 0.5 usec correction, and every 1 volt increase result in a 0.1 usec increase so that a 20V difference results in a 1.5 usec increase). This increase is provided by a scaled correction module (a module that scales the correction over a range of differences based on the bus voltage difference). If the difference is greater than 20V a +1.5 usec pulse width correction is applied to the greater voltage bus. Alternatives include decreasing the lesser voltage bus pulse width, changing both bus pulse widths, or reducing a pulse width to zero.

A proportional gain is preferably used to linearly reduce the pulse width correction as output increases. The proportional gain, Pgain=1−Iout/400 A. This provides a unity gain at 0 A output, and 0 gain at 400 A or greater. Thus, the correction above (0.5 sec at 10V, for example), is multiplied by Pgain to result in the proportional correction. For example, at 300 A and a 14 V difference, the correction=0.9 usec*0.75=0.675 usec correction (the bus with the greater voltage has its pulse width increased by 0.675 usec). The output current can be the commanded current or a sensed current. This is implemented using a load proportional gain module (a module that applies a gain to the correction in based on load over a range of loads). The load proportional gain results in equal pulse widths when the load current is or exceeds 400 A. It also eliminates load sharing imbalance during arc starts. Referring now to FIG. 10, a bus feedback signal indicative of a plurality of bus voltages 1001 is provided to a bus voltage balancing module 1003, which is part of the inverter controller. Module 1003 includes a load proportional gain module 1007 that receives load feedback. Alternatives include a nonlinear gain, and/or two or more gains. For example above a current threshold the gain could be a first value, and below the threshold the gain could be a greater value.

Production variance in HF transformer magnetizing inductance can affect bus balancing. Magnetizing currents (Im) can be unbalanced between top and bottom inverters, and the power losses associated with circulating Im can effectively unbalance the voltage between bus halves with an open circuit. The above bus balancing can correct for this by adjusting the inverter pulse widths. The bus balancing can be implemented with a bus that is or is not preregulated.

The affect of unbalanced magnetizing currents can be reduced during OCV by using open loop control to reduce pulse width. Closed loop pulse width control can be used under load to allow the output to be regulated to a commanded value. Either current or voltage can be used to determine if it is an OCV or load condition. Then, when in the OCV condition, a duty cycle limiting module can limit the pulse widths. Bus voltage balancing module 1003 includes a duty cycle limiting module 1011 that receives OCV feedback 1013, which is indicative of a load or no load condition. Other modules may be used to control the bus balancing. The output converter controller and the modules 1003, 1007 and 1011 are preferably part of a digital pulse width controller, such as that described in U.S. Pat. No. 8,455,794. Alternatives provide for an analog controller, a digital controller with discrete elements, a controller using DSPs, and a controller using other circuitry.

Figure 12:
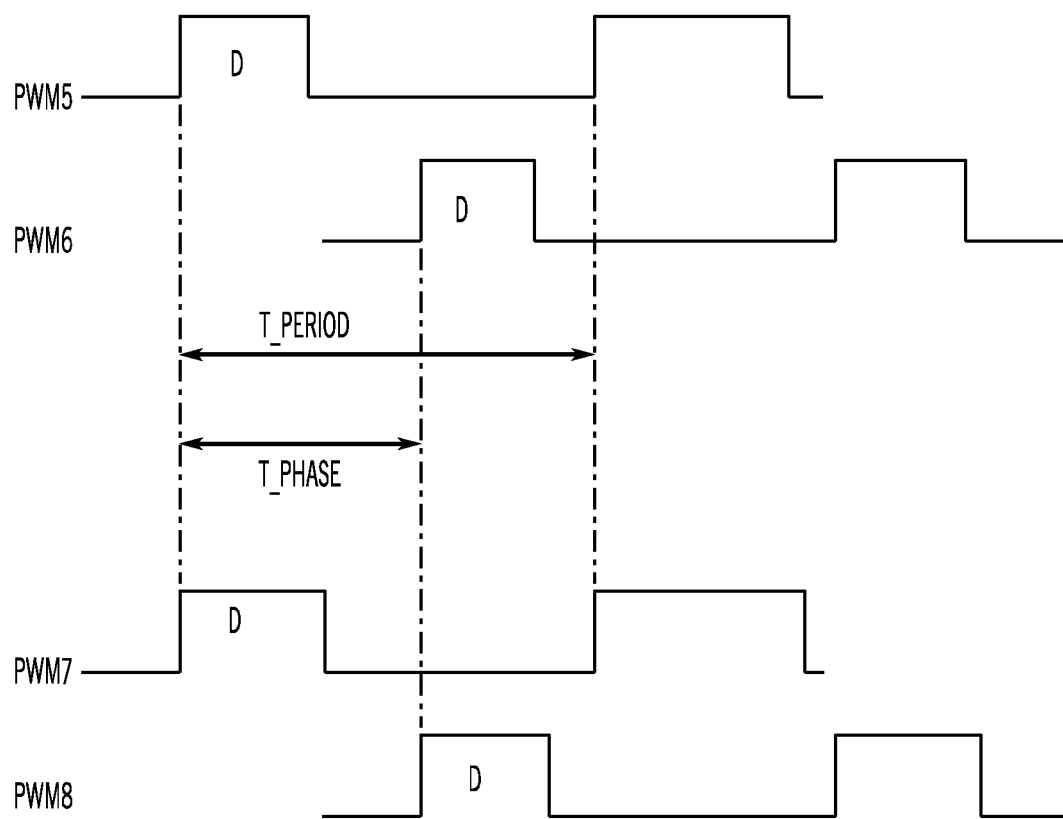
FIG. 12 shows four PWM signals for the inverter-based output converter in accordance with the preferred embodiment.

The inverter control circuit generates four PWM signals as indicated in FIG. 12. The PWM signals control the switches (Z8-Z15) as shown in FIGS. 4 & 5. Each PWM signal has a switching frequency or period (T_PERIOD) and a duty cycle (D) representing the time duration that the switches are turned on. Two of the PWM signals are phase staggered by one half the switching period. It can be seen from FIGS. 4 & 5 that PWM5 & PWM7 apply a voltage (VBUS_TOP, VBUS_BOTTOM) across the primaries of the inverter transformers (T2, T3) in one polarity, and that PWM6 & PWM8 apply the same voltages in an opposite polarity. A magnetic flux is generated in each transformer in proportion to the applied voltage and duty cycle of the PWM signals. As is well known it is desirable that the volt*sec product that is applied across the transformer in one polarity be balanced with the volt*sec product applied in the opposite polarity, otherwise transformer saturation can occur. Because of the phase staggered nature of these opposite polarity pulses and the dynamic nature of a welding arc or process, the duty cycle or PWM values are often changing from one cycle to the next. The control shown in FIG. 11, may implement a flux balancing algorithm to reduce the likelihood of transformer saturation by keeping track of the net time or duty cycle value applied in each polarity and limiting the PWM duty cycle value for either polarity if a flux limit is exceeded.

Figure 13:
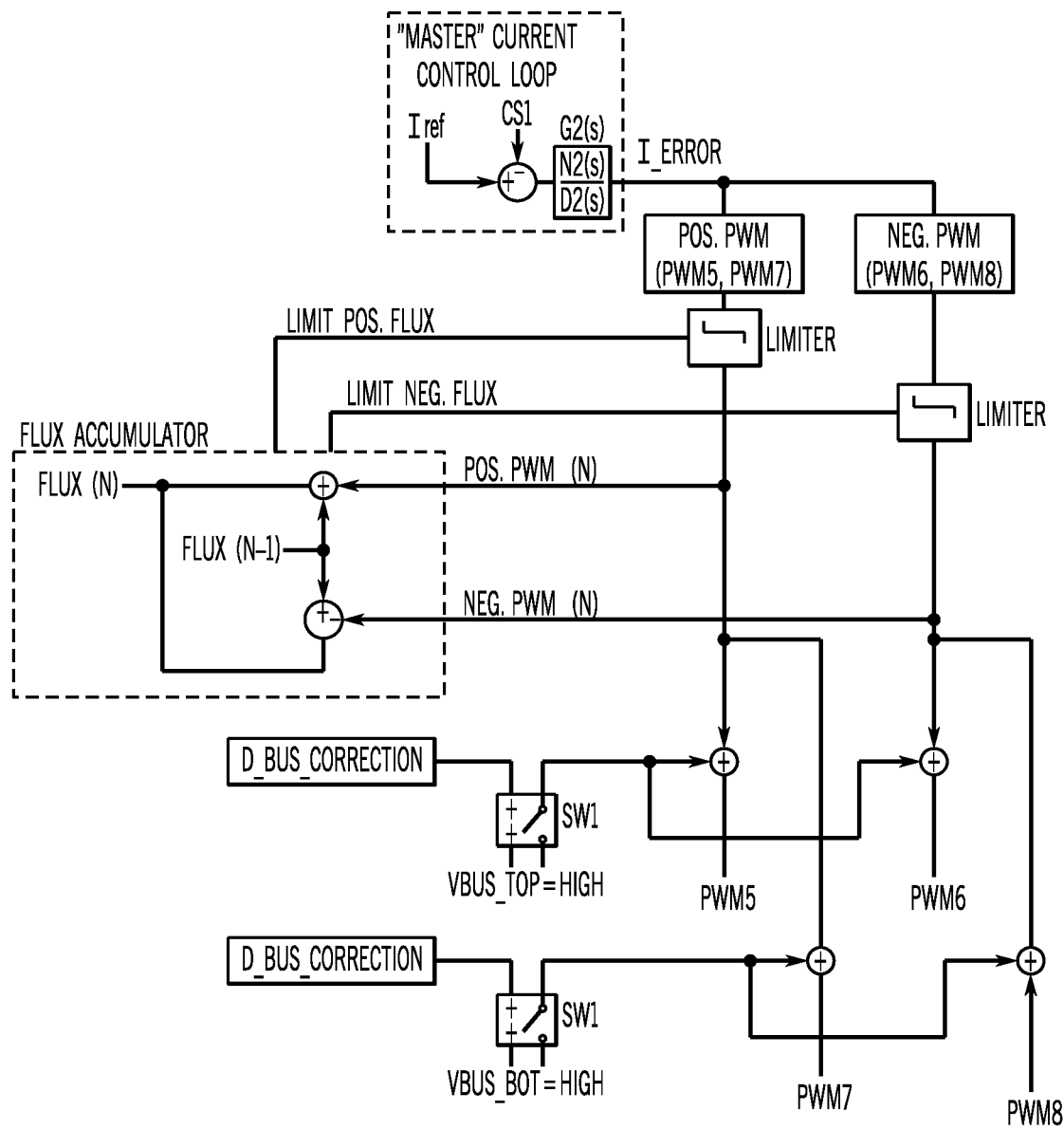
FIG. 13 is a control loop for an inverter based output converter in accordance with the preferred embodiment.

A model of an inverter control loop illustrating a flux limiting function as well as a DC bus balancing function is shown in FIG. 13. A master current control loop generates an error signal (I_ERROR) in response to a reference signal or command (REF) and a current feedback signal indicative of the output current of the welding type power supply (CS1). The master current control loop may contain a compensation circuit or function (G2(s)) to tailor the dynamic characteristics of the control loop and provide stability. The error signal is used to generate a positive polarity PWM signal, which ultimately controls PWM5 and PWM7, and a negative polarity PWM signal which controls PWM6 & PWM8. Positive and negative being arbitrary descriptors of the polarity of the voltage applied across the primaries of the transformers (T2,T3). These PWM signals may be generated by discrete sampling of the error signal, or by a continuous function such as a PWM ramp comparator.

A flux accumulator or integrator is shown which keeps a history of the net flux or volt*sec that has been applied to the transformers. In effect it only is necessary to keep track of the PWM values due to the nature of the regulated bus voltage provided as an output of the pre-regulator. Alternately the bus voltage could be measured and this used as an input to the flux accumulator. The net flux is calculated by adding the positive PWM value and subtracting the negative PWM value, to a running accumulator. If the flux value or in this case net PWM value exceeds a positive threshold then a limiter may be applied to limit the maximum value of the positive PWM value as shown. Likewise if the net PWM value exceeds a negative threshold then a limiter may be applied to limit the maximum value of the negative PWM value as shown.

A DC bus correction duty cycle term (D_BUS_CORRECTION) may be selectively added to the two PWM signals (PWM5, PWM6) that control the upper inverter on the top bus, or added to the two PWM signals (PWM7, PWM8) that control the lower inverter on the bottom bus. This DC bus correction term may be added in coordination with the pre-regulator control to assist with DC bus balancing for certain conditions, such as may occur for small PWM values for PWM5-PWM8. For example as described for the pre-regulator control, if a DC bus imbalance is less than a first limit, bus correction may be disabled. If DC bus imbalance exceeds this first limit then the pre-regulator may take action to balance the DC bus voltages as described. If the DC bus imbalance exceeds a second limit then a signal may be communicated to the inverter control and the bus correction term applied to either the upper or lower inverter PWM signals (D_BUS_CORRECTION). If the DC bus imbalance exceeds a third limit then both the inverter and pre-regulator may be disabled or other action taken. The DC bus correction term applied to the inverter PWM signals may be a fixed duty cycle term or may be set in proportion or some other relation to the magnitude of the imbalance. In general this bus correction term may be limited to a relatively small percentage of the PWM signal.

The stacked boost configuration may be further extended to a triple, or more, boost circuit arrangement with current balancing implemented in a similar fashion as described. For example a target current could be determined for each of the upper inductors or current branches by calculating or measuring the total current and dividing by the number of boost circuits in the arrangement.

Alternative inverter topologies such as a stacked forward, half bridge, flyback or other topology could be used. In addition in some configurations of a welding type power supply it may be desirable to use a single inverter circuit operating from the total bus voltage, rather than a stacked or series arrangement of inverter circuits while still using some of the features and advantages of the pre-regulator circuit as described.

Other pre-regulator and/or inverter control schemes are also possible such as variable frequency, fixed on time, fixed off time, frequency dithering, or various combinations as alternative or in conjunction with the PWM schemes described.

Alternative inverter topologies such as a stacked forward, half bridge, flyback or other topology could be used. In addition in some configurations of a welding type power supply it may be desirable to use a single inverter circuit operating from the total bus voltage, rather than a stacked or series arrangement of inverter circuits while still using some of the features and advantages of the pre-regulator circuit as described.

Other pre-regulator and/or inverter control schemes are also possible such as variable frequency, fixed on time, fixed off time, frequency dithering, or various combinations as alternative or in conjunction with the PWM schemes described.

Numerous modifications may be made to the method and system which still fall within the intended scope hereof. Thus, it should be apparent that there has been provided a method and apparatus for providing welding type power that fully satisfies the objectives and advantages set forth above. Although the method and system have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A welding system for power supply comprising:
   the welding system for power supply for providing power suitable for electric arc welding, plasma arc cutting or induction heating,
   a preregulated bus including a plurality of capacitors,
   an output converter, including a plurality of switches, configured to receive the preregulated bus and to provide a welding power output, and having a control input, wherein the plurality of switches in the output converter are controlled by the control input; and a controller configured to receive a bus feedback signal from the preregulated bus indicative of a plurality of bus voltages, wherein the controller has a converter control output connected to the control input, wherein the controller has a bus voltage balancing module comprising at least one of hardware and software, wherein the controller configured to balance the plurality of bus voltages across the plurality of capacitors across the preregulated bus, wherein the bus voltage balancing module includes a scaled correction module comprising at least one of hardware and software, wherein the controller configured to scale a correction and is responsive to the bus feedback signal, and wherein the converter control output is responsive to the bus voltage balancing.

2. The welding system for power supply of claim 1, wherein the controller further receives load feedback indicative of a load output, and wherein the bus voltage balancing module further includes a load proportional gain module responsive to the load feedback.

3. The welding system for power supply of claim 1, wherein the controller further receives open circuit voltage feedback indicative of an open circuit voltage or load condition, and wherein the bus voltage balancing module further includes a duty cycle limiting module responsive to the open circuit voltage feedback.

4. The welding system for power supply of claim 1, wherein the preregulated bus further comprising a split bus with a first bus voltage and a second bus voltage and the bus feedback signal is responsive to a difference between the first and second bus voltages exceeding a threshold.

5. The welding system for power supply of claim 2, wherein the output converter includes at least one stacked inverter circuit.

6. The welding system for power supply of claim 2, wherein the output converter includes a stacked full bridge inverter.

* * * * *